(12) United States Patent
Lim

(10) Patent No.: US 7,787,095 B2
(45) Date of Patent: Aug. 31, 2010

(54) THIN FILM TRANSISTOR ARRAY PANEL AND METHOD OF MANUFACTURING THE SAME

(75) Inventor: Ji-Suk Lim, Daejeon-si (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 12/029,767

(22) Filed: Feb. 12, 2008

(65) Prior Publication Data

US 2008/0284969 A1 Nov. 20, 2008

(30) Foreign Application Priority Data

May 17, 2007 (KR) ...................... 10-2007-0048033

(51) Int. Cl.
*G02F 1/1345* (2006.01)
*G02F 1/1343* (2006.01)

(52) U.S. Cl. ........................ 349/152; 349/145; 349/187

(58) Field of Classification Search ........................ None
See application file for complete search history.

(56) References Cited

U.S. PATENT DOCUMENTS

| | | |
|---|---|---|
| 6,842,200 B1 | 1/2005 | Su et al. |
| 2004/0150597 A1 | 8/2004 | Chang |
| 2005/0001858 A1 | 1/2005 | Morita et al. |
| 2005/0051778 A1 | 3/2005 | Chang |
| 2006/0139551 A1 | 6/2006 | Kimura |
| 2006/0267914 A1 | 11/2006 | Chang et al. |

FOREIGN PATENT DOCUMENTS

| | | |
|---|---|---|
| GB | 2384360 | 12/2003 |
| JP | 2001281687 | 10/2001 |
| JP | 2006189548 | 7/2006 |
| JP | 2006209089 | 8/2006 |
| JP | 2006215425 | 8/2006 |
| KR | 19990054284 | 7/1999 |
| KR | 1020040050523 | 6/2004 |
| KR | 1020040087452 | 10/2004 |
| KR | 1020050018327 | 2/2005 |
| KR | 1020050066425 | 6/2005 |
| KR | 1020060028879 | 4/2006 |

OTHER PUBLICATIONS

European Search Report for application No. 08005722.7-2205 dated Sep. 15, 2008.

*Primary Examiner*—Omar Rojas
(74) *Attorney, Agent, or Firm*—Cantor Colburn LLP

(57) ABSTRACT

A thin film transistor array panel including a substrate, a plurality of first signal lines formed on the substrate, a plurality of second signal lines, insulated from the first signal lines, which are formed on the substrate and which define an area of a display area by traversing the first signal lines, a driver disposed on a peripheral area, a plurality of connection lines, disposed on the peripheral area, which couple the driver to each of the first signal lines, and an insulating layer which insulate the first signal lines from the connection lines. The insulating layer includes a plurality of contact holes, portions of the first signal lines and the connection lines are connected through the contact holes, and sizes of exposed portions of the first signal lines exposed through the contact holes increase as respective distances from the contact holes to the driver increase.

20 Claims, 28 Drawing Sheets

FIG. 8
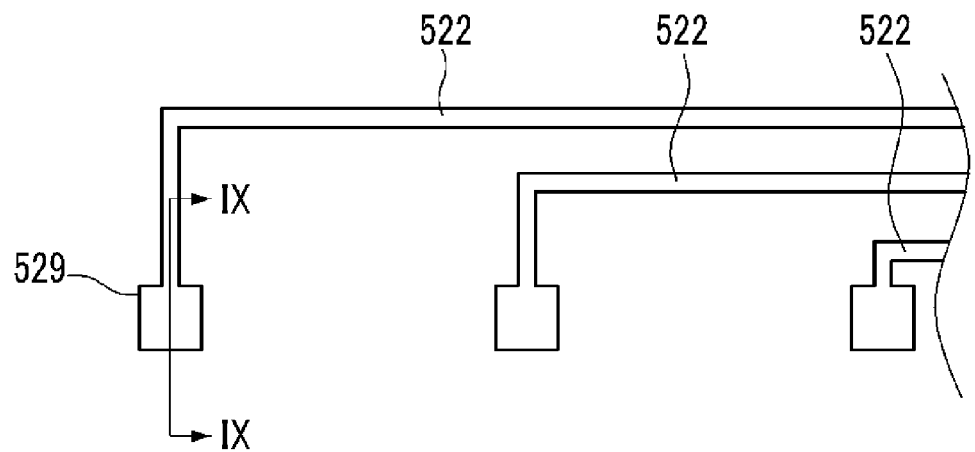
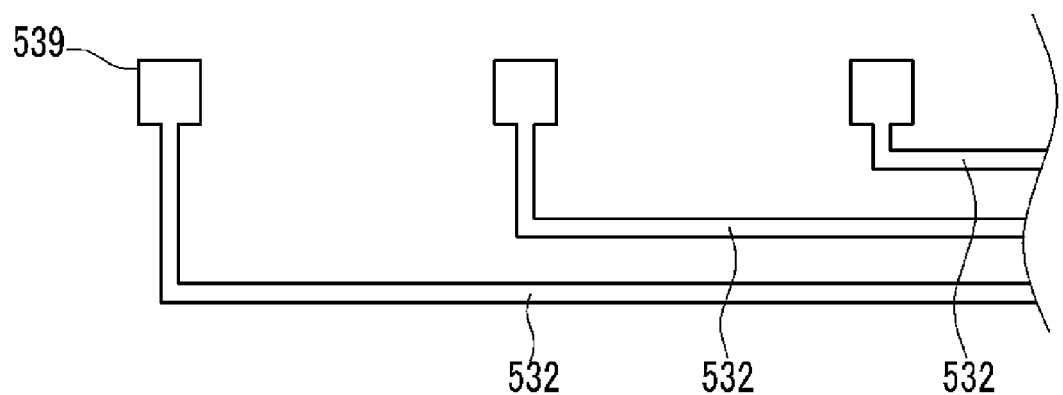

THIN FILM TRANSISTOR ARRAY PANEL AND METHOD OF MANUFACTURING THE SAME

This application claims priority to Korean Patent Application No. 2007-48033, filed on May 17, 2007, and all the benefits accruing therefrom under 35 U.S.C §119, the contents of which in its entirety are herein incorporated by reference.

BACKGROUND OF THE INVENTION (a) Field of the Invention

The present invention relates to a thin film transistor array panel and a method of manufacturing a thin film transistor array panel.

(b) Description of the Related Art

Generally, liquid crystal displays ("LCDs") include a lower panel, an upper panel facing the lower panel, a liquid crystal layer interposed between the lower panel and the upper panel and a driver to drive the LCD. The lower panel includes a plurality of gate lines, a plurality of data lines and pixels, each connected to a gate line of the plurality of gate lines and a data line the plurality of data lines and including a switching element such as a thin film transistor ("TFT") or a pixel electrode, for example. The lower panel is referred to as a TFT array panel. The upper panel includes a common electrode and is referred to as a common electrode panel. The driver includes a driving chip, for example, but is not limited thereto.

The driver is disposed on a peripheral area of the lower panel, and, more specifically, the driver is disposed on an upper area of the peripheral area or a lower peripheral area of the peripheral area of the TFT array panel corresponding to an end portion of the data lines. A size of the TFT array panel increases with a size of the driver. Thus, the size of the LCD also increases.

Further, when lengths between adjacent signal transmission lines which transmit signals from the driver to the data lines or the gate lines are different, resistance differences between the signal transmission lines increase as the length differences increase. As such, a signal delay, for example, may be irregular, and a display performance of the LCD may deteriorate.

SUMMARY OF THE INVENTION

According to an embodiment of the present invention, a thin film transistor array panel is provided, comprising a substrate having a display area and a peripheral area disposed around the display area, a plurality of first signal lines formed on the substrate, a plurality of second signal lines, insulated from the first signal lines, which are formed on the substrate and which define an area of the display area by traversing the first signal lines, a driver disposed on the peripheral area, a plurality of connection lines, disposed on the peripheral area, which couple the driver to each of the first signal lines, and an insulating layer which insulate the first signal lines from the connection lines. The insulating layer includes a plurality of contact holes, portions of the first signal lines and the connection lines are connected through the contact holes, and sizes of exposed portions of the first signal lines exposed through the contact holes increase as respective distances from the contact holes to the driver increase.

The first signal lines may be formed on a different layer from the connection lines with respect to the insulating layer, and the first lines and the connection lines may be contacted with one another through the contact holes.

The first signal lines and the connection lines may be covered with the insulating layer, the contact holes may include first contact holes which expose the first signal lines and second contact holes which expose the connection lines, and the first signal lines and the connection lines may be contacted with one another through the first and second contact holes.

According to another embodiment, a thin film transistor array panel including a display area and a peripheral area having first, second, third, and fourth peripheral areas is provided. The thin film transistor comprises a plurality of gate lines formed on an insulation substrate and extended in a first direction, a gate insulating layer formed on the gate lines, a plurality of data lines formed on the gate insulating layer and extended in a second direction, the second direction being perpendicular to the first direction, a driver disposed on the first or second peripheral area, and a plurality of data signal transmission lines formed on at least one of the third and fourth peripheral areas. The portions of the data signal transmission lines include end portions connected to end portions of the data lines via connection lines having different contact sizes in accordance with respective distances from the connection lines to the driver, and the first peripheral area faces the second peripheral area in the first direction, and the third peripheral area faces the fourth peripheral area in the second direction.

The plurality of data signal transmission lines may include a plurality of first data signal transmission lines formed on the third peripheral area and connected to even-numbered data lines of the data lines and the driver, and a plurality of second data signal transmission lines formed on the fourth peripheral area and connected to odd-numbered data lines of the data lines and the driver.

The plurality of first data signal transmission lines may include a plurality of first even signal transmission lines connected to (j−2)-th data lines and a plurality of second even signal transmission lines connected to j-th data lines (here, j is a multiple of four).

The plurality of second data signal transmission lines may include a plurality of first odd signal transmission lines connected to (j−3)-th data lines and a plurality of second odd signal transmission lines connected to (j−1)-th data lines.

The first even signal transmission lines may be formed on a different layer from the second even signal transmission lines with respect to the insulating layer, and the first odd signal transmission lines may be formed on a different layer from the second odd signal transmission lines with respect to the insulating layer.

The first even signal transmission lines and the first odd signal transmission lines may be formed on the same layer as the gate lines, and the second even signal transmission lines and the second odd signal transmission lines may be formed on the same layer as the data lines.

The first even signal transmission lines and the first odd signal transmission lines may be made of a first metal. At this time, the first metal may be the same metal as that of the gate lines. In addition, the second even signal transmission lines and the second odd signal transmission lines may be made of a second metal. The second metal may be the same metal as that of the data lines.

The first metal may have greater resistivity than the second metal.

The gate insulating layer may include a plurality of first contact holes which expose the end portions of the first even signal transmission lines with different exposed sizes and a plurality of second contact holes which expose the end portions of the first odd signal transmission lines with different exposed sizes, and the end portions of the first even signal transmission lines may be contacted with the end portions of the data lines through the first contact holes with different contact sizes, and the end portions of the first odd signal transmission lines may be contacted with the end portions of the data lines through the second contact holes with different contact sizes.

The thin film transistor array panel may further include a passivation layer formed on the data lines and the data signal transmission lines. The passivation layer may include a plurality of third contact holes which expose the end portions of the second even signal transmission lines with different exposed sizes, a plurality of fourth contact holes which expose the end portions of the second odd signal transmission lines with different exposed sizes, a plurality of fifth contact holes which expose the end portions of the data lines corresponding to the second even signal transmission lines with different exposed sizes, and a plurality of sixth contact holes which expose the end portions of the data lines corresponding to the second odd signal transmission lines with different exposed sizes.

The thin film transistor array panel may further include a plurality of first connecting members formed on the passivation layer and contacting the end portions of the second even signal transmission lines exposed through the third contact holes and the end portions of the corresponding data lines exposed through the fifth contact holes with different contact sizes, and a plurality of second connecting members formed on the passivation layer and contacting the end portions of the second odd signal transmission lines exposed through the fourth contact holes and the end portions of the corresponding data lines exposed through the sixth contact holes with different contact sizes.

The thin film transistor array panel may further include at least one dummy wire formed on one of the third and fourth peripheral areas and insulated from the gate lines and the data signal transmission lines, a plurality of connection wires spaced apart from the data lines and connected to the dummy wire, and a plurality of first diodes connected to the connection wires and the data lines. Each of the first diodes may have a first control electrode, a first semiconductor, a first input electrode, and a first output electrode.

The dummy wire may be made of the same material as the gate lines, and the connection wires may be made of the same material as the data lines.

Portions of the first control electrodes may be extended from the end portions of the first even signal transmission lines.

The gate insulating layer may further include a plurality of third contact holes, and the end portions of the data lines directly connected to the second even signal transmission may be contacted with the first control electrodes through the third contact holes, respectively.

Each of the data lines may include the first input electrode. Each of the connecting wires may include a first output electrode facing the first input electrode, and each of the first semiconductors may be formed on the gate insulating layer and formed between the first input electrode and the output electrode.

The dummy wire may further include a plurality of second control electrodes. Each of the connection wires may further include a second input electrode, each of the data lines may further include a second output electrode facing the second input electrode, and the thin film transistor array panel may further include a plurality of second semiconductors, wherein each of the second semiconductors is formed on the gate insulating layer and formed between the second input electrode and the second output electrode. The second control electrode, the second semiconductor, the second input electrode, and the second output electrode may form a second diode.

The thin film transistor array panel may further include a passivation layer formed on the data lines and the data signal transmission lines. The passivation layer may include a plurality of fourth contact holes which expose the end portions of the second even signal transmission lines with different exposed sizes and a plurality of fifth contact holes which expose the end portions of the data lines corresponding to the second even signal transmission lines with different exposed sizes.

The thin film transistor array panel may further include a plurality of first connecting members formed on the passivation layer and contacting the end portions of the second even signal transmission lines exposed through the fourth contact holes and the end portions of the corresponding data lines exposed through the fifth contact holes with different contact sizes.

The thin film transistor array panel may further include a passivation layer formed on the data lines and the data signal transmission lines. The passivation layer may include a plurality of first contact holes which expose the end portions of the first even signal transmission lines with different exposed sizes along with the gate insulating layer, a plurality of second contact holes which expose the end portions of the first odd signal transmission lines with different exposed sizes along with the gate insulating layer, a plurality of third contact holes which expose the end portions of the data lines corresponding to the first even signal transmission lines with different exposed sizes along with the gate insulating layer, and a plurality of fourth contact holes which expose the end portions of the data lines corresponding to the first odd signal transmission lines with different exposed sizes along with the gate insulating layer.

The thin film transistor array panel may further include a plurality of first connecting members formed on the passivation layer and contacting the end portions of the first even signal transmission lines exposed through the first contact holes and the end portions of the corresponding data lines exposed through the third contact holes with different contact sizes, and a plurality of second connecting members formed on the passivation layer and contacting the end portions of the first odd signal transmission lines exposed through the second contact holes and the end portions of the corresponding data lines exposed through the fourth contact holes with different contact sizes.

The passivation layer may further include a plurality of fifth contact holes which expose the end portions of the second even signal transmission lines with different exposed sizes, a plurality of sixth contact holes which expose the end portions of the second odd signal transmission lines with different exposed sizes, a plurality of seventh contact holes which expose the end portions of the data lines corresponding to the end portions of the second even signal transmission lines with different exposed sizes, and a plurality of eighth contact holes which expose the end portions of the data lines corresponding to the end portions of the second odd signal transmission lines with different exposed sizes.

The thin film transistor array panel may further include a plurality of third connecting members formed on the passivation layer and contacted with the end portions of the second even signal transmission lines exposed through the fifth contact holes and the end portions of the corresponding data lines exposed through the seventh contact holes with different contact sizes, and a plurality of fourth connecting members formed on the passivation layer and contacted with the end portions of the second odd signal transmission lines exposed through the sixth contact holes and the end portions of the corresponding data lines exposed through the eighth contact holes with different contact sizes.

The thin film transistor array panel may further include pixel electrodes formed on the passivation layer, and the first to fourth connecting members may be made of the same material as the pixel electrodes.

The contact sizes may increase as a distance from the driver increases.

According to another embodiment, a manufacturing method of a thin film transistor array panel including a display area, a peripheral area having first, second, third, and fourth peripheral areas, and a driver disposed on the first or second peripheral area is provided. The manufacturing method comprises forming a plurality of gate lines extended in a first direction on an insulation substrate, forming a gate insulating layer on the gate lines, forming a plurality of data lines extended in a second direction on the gate insulating layer, the second direction being perpendicular to the first direction, and forming a plurality of data signal transmission lines on at least one of the third and fourth peripheral areas. The portions of the data signal transmission lines comprise end portions connected to end portions of corresponding data lines via connections with different contact sizes in accordance with respective distances of the connections from the driver, and other end portions connected to the driver. The manufacturing method may further include forming a plurality of contact holes on the gate insulating layer exposing portions of the data signal transmission lines with different exposed sizes, and the end portions of the data lines are contacted with the end portions of the data lines exposed through the contact holes with different contact sizes, respectively.

The manufacturing method may further include forming a passivation layer on the data lines, and forming a plurality of connecting members on the passivation layer. At this time, the passivation layer may include a plurality of first contact holes exposing the end portions of portions of the data signal transmission lines with different exposed sizes and a plurality of second contact holes exposing the end portions of portions of the data lines with different exposed sizes, and the connection wires may contact with the end portions of the portions of the data signal transmission lines and the end portions of the portions of the data lines through the first and second contact holes with different contact sizes, respectively.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIGS. 8, 10 and 12 are layout views of the TFT array panel shown in FIGS. 5 to 7 in intermediate operations of a manufacturing method thereof according to a first embodiment of the present invention;

DETAILED DESCRIPTION OF THE INVENTION

Figure 1:
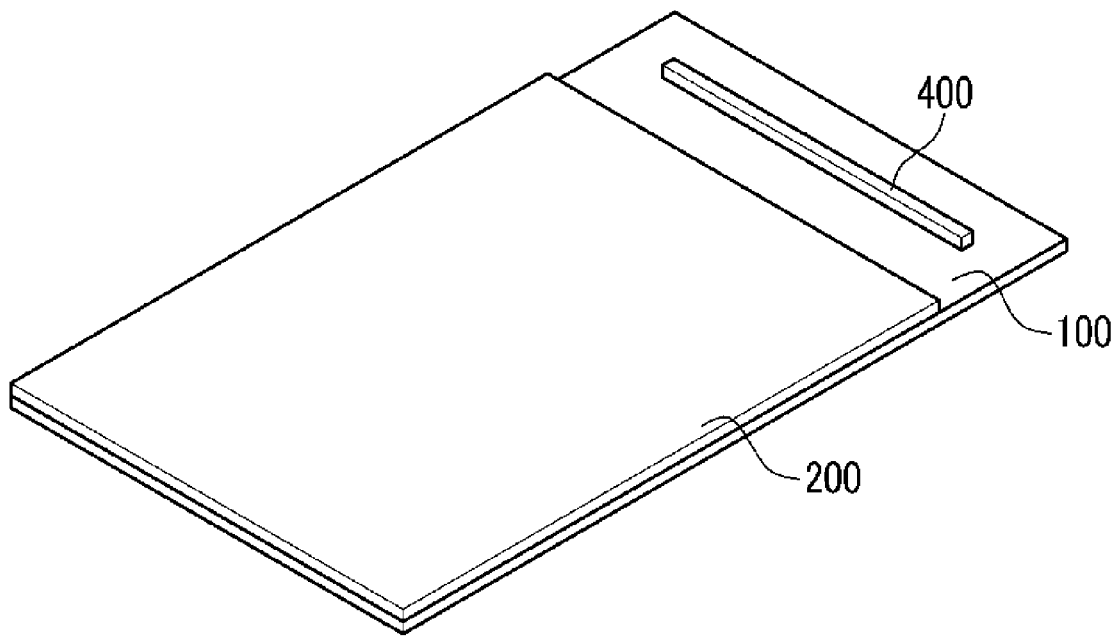
FIG. 1 is a perspective view of an exemplary thin film transistor ("TFT") array panel according to exemplary embodiments of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

TFT array panels according to exemplary embodiments will be described in detail with reference to the accompanying drawings. First, a display device including a TFT array panel according to embodiments of the present invention and the TFT array panel will be described with reference to FIGS. 1 to 7.

Figure 2:
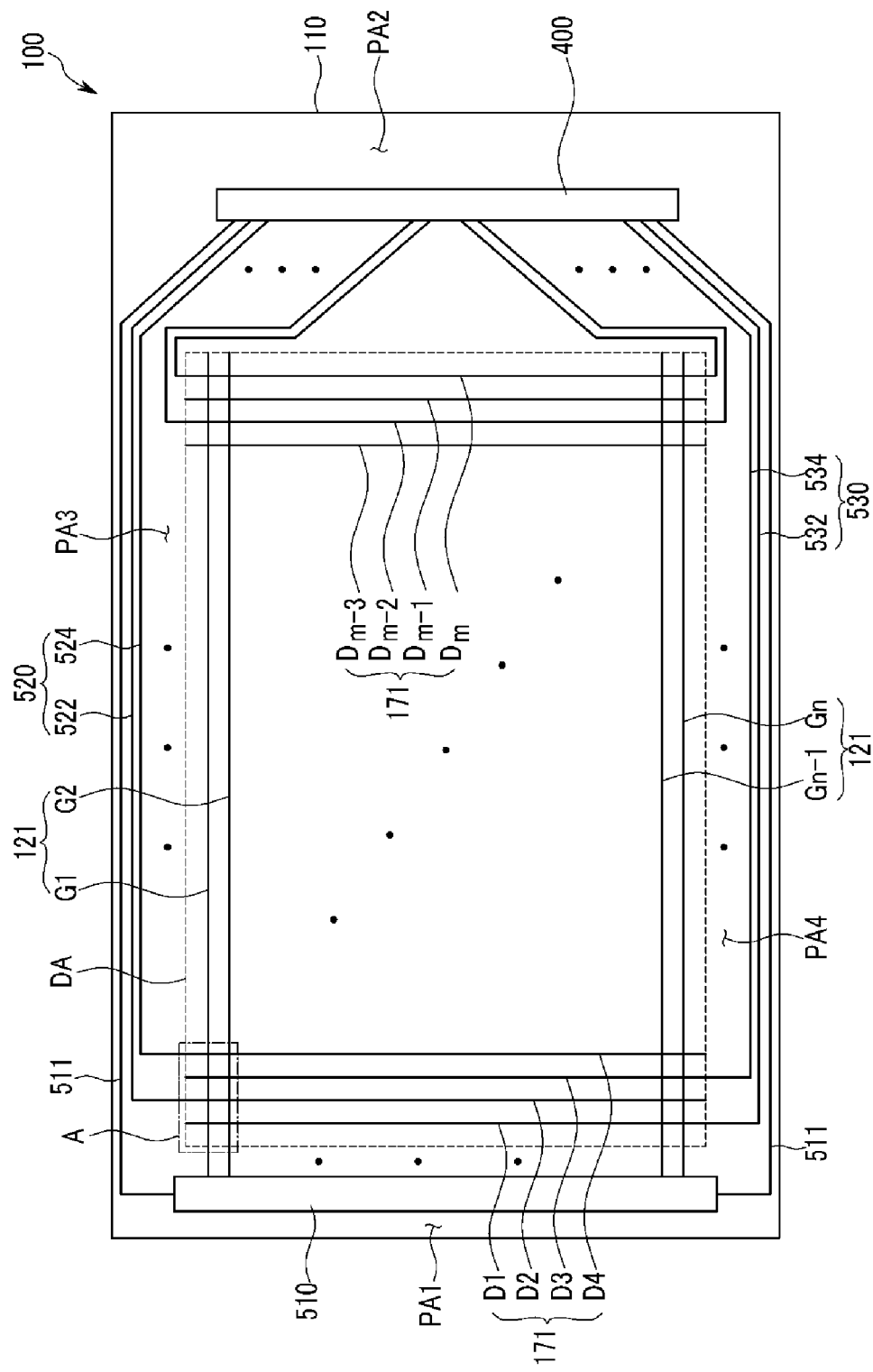
FIG. 2 is a schematic view of a TFT array panel according to a first embodiment of the present invention.
Figure 3:
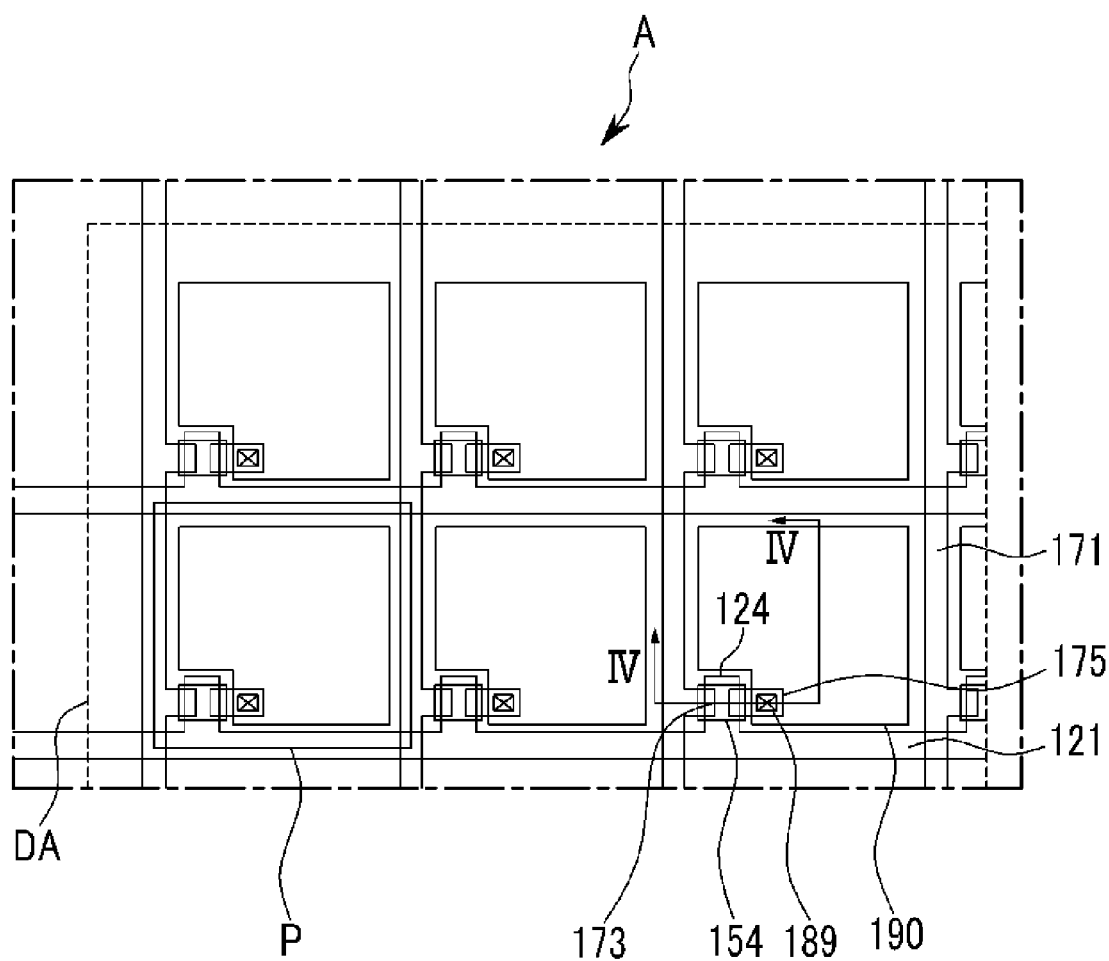
FIG. 3 is an enlarged view of an "A" portion of the TFT array panel shown in FIG. 2.
Figure 4:
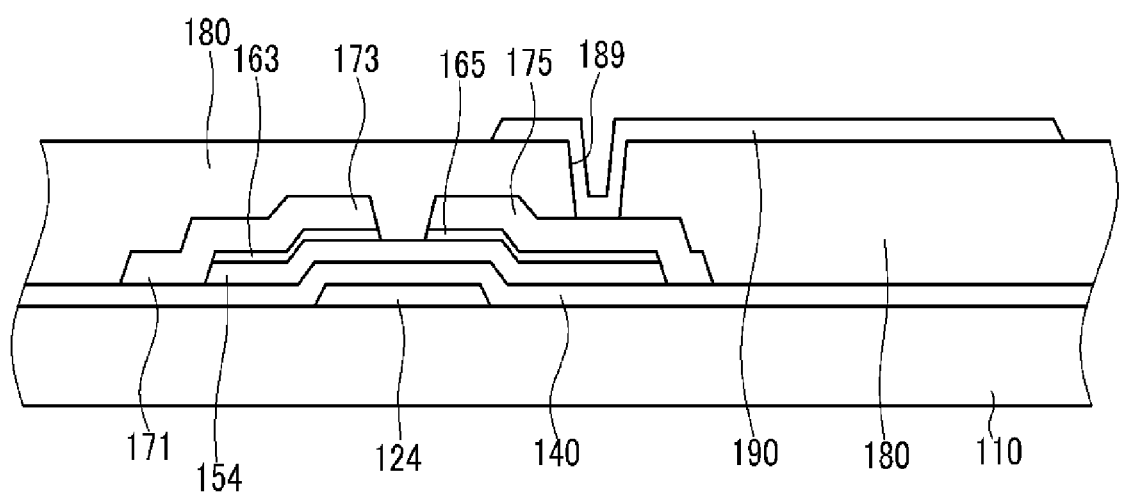
FIG. 4 is a sectional view of the TFT array panel shown in FIG. 3 taken along line IV-IV.
Figure 5:
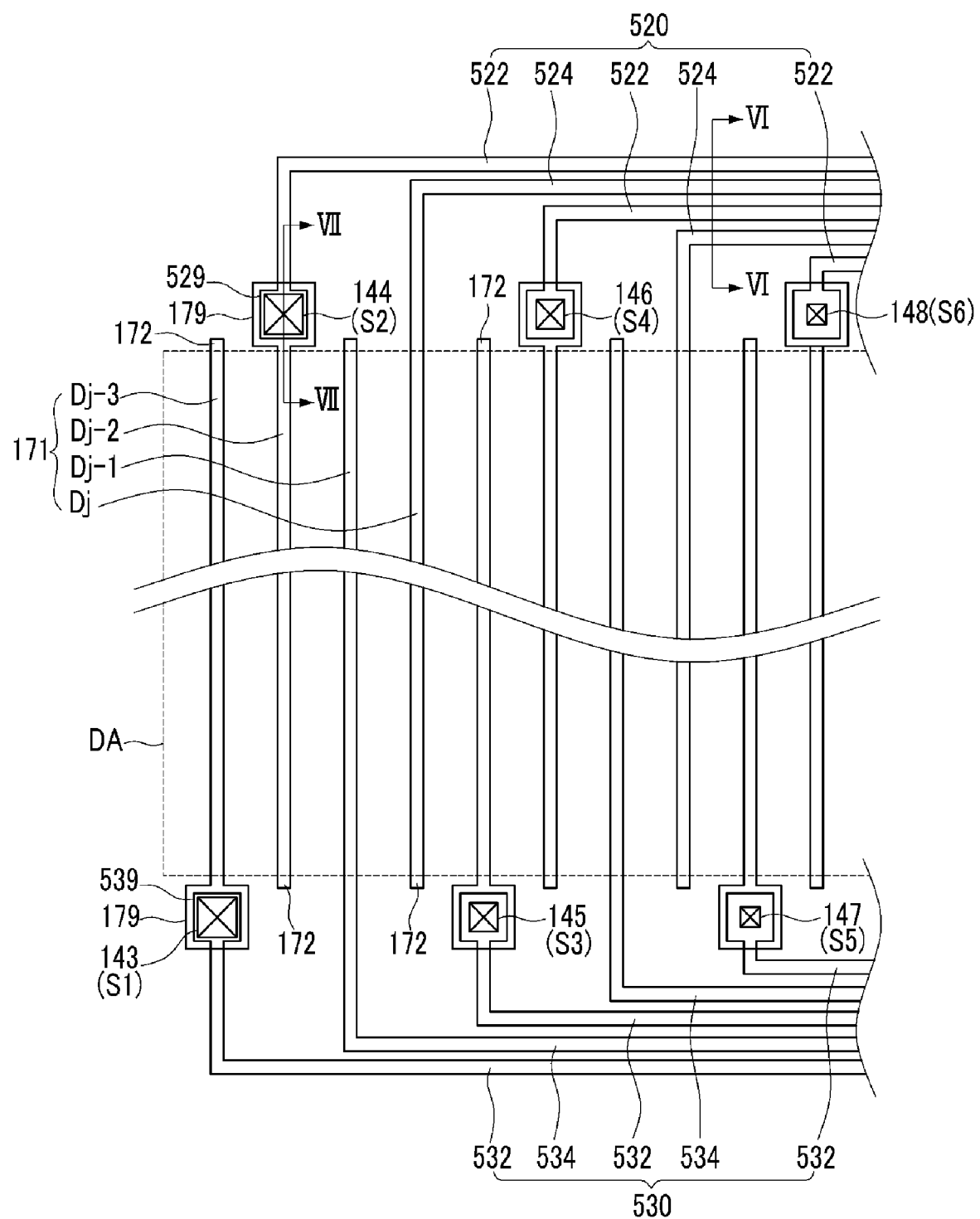
FIG. 5 is a layout view of data lines and signal transmission lines of the TFT array panel shown in FIG. 2.
Figure 6:
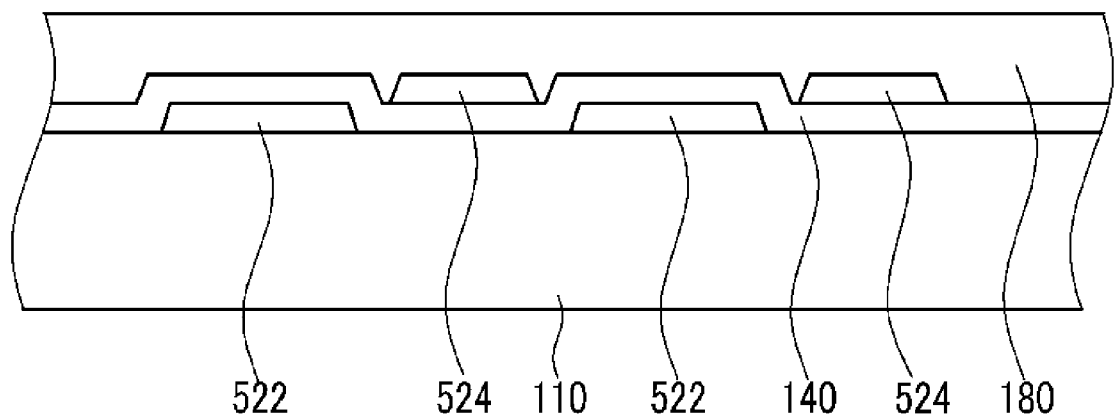
FIGS. 6 and 7 are sectional views of the TFT array panel shown in FIG. 5 taken along lines VI-VI and VII-VII.
Figure 7:
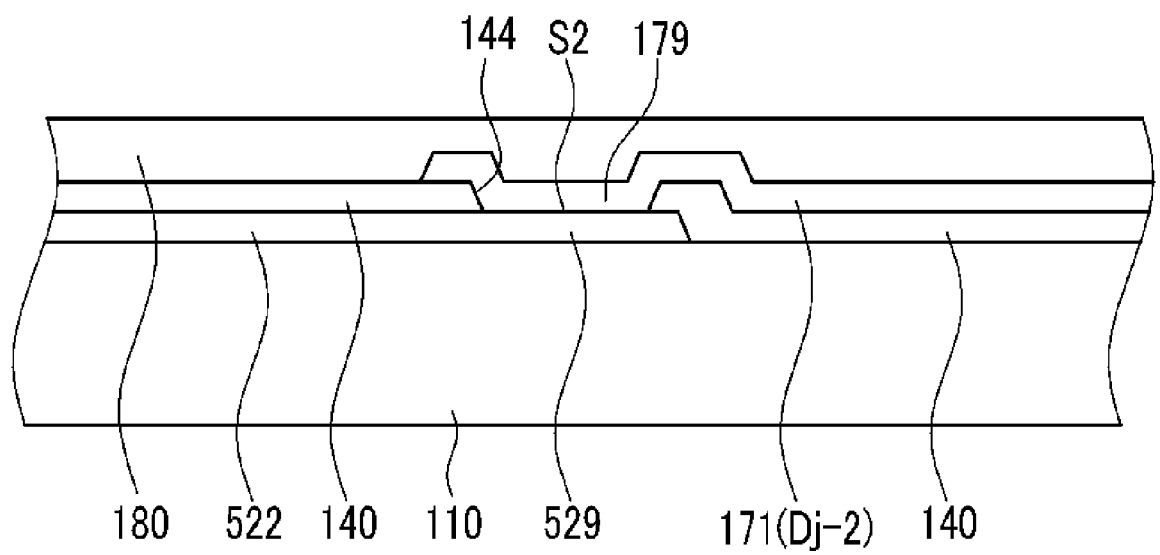

As noted above, FIG. 1 is a perspective view of an exemplary thin film transistor ("TFT") array panel according to exemplary embodiments of the present invention, FIG. 2 is a schematic view of a TFT array panel according to a first embodiment of the present invention, FIG. 3 is an enlarged view of an "A" portion of the TFT array panel shown in FIG. 2, FIG. 4 is a sectional view of the TFT array panel shown in FIG. 3 taken along line IV-IV, FIG. 5 is a layout view of data lines and signal transmission lines of the TFT array panel shown in FIG. 2, and FIGS. 6 and 7 are sectional views of the TFT array panel shown in FIG. 5 taken along lines VI-VI and VII-VII.

Referring to FIG. 1, a display device, according to exemplary embodiments of the present invention, may be an LCD, and may include a thin film transistor (TFT) array panel 100 and a common electrode panel 200 facing the TFT array panel with a liquid crystal layer (not shown) disposed therebetween.

Referring to FIGS. 2 and 3, the TFT array panel 100 is divided into a display area DA, in which images may be displayed, and a peripheral area PA that is disposed around an outer border of the display area DA. Referring to FIGS. 2 and 3, the display area DA includes a plurality of gate lines 121, or G1-Gn, a plurality of data lines 171, or D1-Dm, and a plurality of pixels (not shown) connected to the plurality of gate lines 121 and the plurality of data lines 171. Each pixel may include a switching element connected to a corresponding gate line 121 of the plurality of the gate lines 121 and a corresponding data line 171 of the plurality of data lines 171, as well as a liquid crystal capacitor and a storage capacitor that are each connectable to the switching element. Here, it is noted that, in embodiments of the invention, the storage capacitor may be omitted.

The peripheral area PA includes first to fourth peripheral areas PA1, PA2, PA3 and PA4 to enclose the display area DA. A gate driver 510 is formed on the first peripheral area PA1. The second peripheral area PA2 is positioned across the display area DA in a substantially horizontal position and in substantial opposition to the first peripheral area PA1. A driver 400 is formed on the second peripheral area PA2. First data signal transmission lines 520 and a selection of gate signal transmission lines 511 are formed on the third peripheral area PA3. Similarly, second data signal transmission lines 530 and the remaining gate signal transmission lines 511 are formed on the fourth peripheral area PA4. The third peripheral area PA3 opposes the fourth peripheral area PA4 across the display area DA in a substantially vertical direction.

The gate driver 510 is coupled to the driver 400 through each of the gate signal transmission lines 511, and the driver 400 is coupled to the data lines 171 through the first and second data signal transmission lines 520 and 530. In order to prevent an overlapping of the first and second data signal transmission lines 520 and 530, the gate signal transmission lines 511 formed on the third and fourth peripheral areas PA3 and PA4 are positioned outside of the first and second data signal transmission lines 520 and 530, respectively, with respect to the display area DA. Here, it is noted that, in alternative embodiments, the gate signal transmission lines 511 may also be formed only on one of the third peripheral area PA3 and the fourth peripheral area PA4.

As shown in FIG. 2, the first data signal transmission lines 520 are coupled to the even-numbered data lines 171 and the second data signal transmission lines 530 are coupled to the odd-numbered data lines 171. However, it is understood that the data lines 171 and the first and second data signal transmission lines 520 and 530 may be coupled to one another in various alternative formats.

The first data signal transmission lines 520 include pluralities of first and second even signal transmission lines 522 and 524. Each first even signal transmission line 522 of the plurality of the first even signal transmission lines 522 are respectively coupled to the (j–2)-th data lines Dj–2 of the even-numbered data lines 171. Similarly, each second even signal transmission line 524 of the plurality of second even signal transmission lines 524 are respectively coupled to the j-th data lines Dj of the even-numbered data lines 171. Here, j is a multiple of four. Similarly, the second data signal transmission lines 530 include respective pluralities of first and second odd signal transmission lines 532 and 534. The plurality of first odd signal transmission lines 532 are coupled to the (j–3) data lines Dj–3 of the odd-numbered data lines, and the plurality of second odd signal transmission lines 534 are coupled to the (j–1)-th data lines Dj–1 of the odd-numbered data lines.

The gate driver 510 may include a shift register having a plurality of stages and may comprise a plurality of driving TFTs. The gate driver 510 may comprise the gate lines 121, the data lines 171 and the pixels. The gate driver 510 sequentially transmits a gate signal to the gate lines 121 in accordance with gate control signals applied with the driver 400 through the gate signal transmission lines 511.

The driver 400 may comprise a driving chip, and may be mounted in the TFT array panel 100. As described above, since the driver 400 may be disposed on the second peripheral area PA2 (which corresponds to a right side of the TFT array panel 100 in FIG. 1), sizes of the third or fourth peripheral areas PA3 or PA4, corresponding to upper or lower sides of the TFT array panel 100, may be reduced. The driver 400 outputs various output signals to drive the LCD based on control signals received from an external device (not shown). For example, the driver 400 may output data voltages that are applied to the data lines 171, the gate control signals that are applied to the gate driver 510, a common voltage applied to the common electrode panel 200 or other similar voltages or signals.

In alternative embodiments of the invention, the TFT array panel 100 may have a structure in which the driver 400 is disposed on the first peripheral area PA1 and the gate driver 510 is disposed on the second peripheral area PA2.

A structure of the display area DA of the TFT array panel DA will now be described.

Each gate line 121 of the plurality of gate lines 121 or G1-Gn (here, n is a positive integer) is formed on an insulating substrate 110, which comprises a material such as transparent glass or plastic or combinations thereof. The gate lines 121 transmit gate signals and extend in substantially horizontal directions and are connected to the gate driver 510 on the first peripheral area PA1. Referring to FIGS. 3 and 4, each of the gate lines 121 includes a plurality of gate electrodes 124 to be supplied with gate signals transmitted from the gate driver 510.

In alternative embodiments, each of the gate lines 121 may include an end portion (not shown) having a large area to contact another layer or an external driving circuit. The end portion may be formed on the display area DA or any of the peripheral areas PA (1-4).

The gate lines 121 may comprise an Al-containing metal such as Al or an Al alloy, an Ag-containing metal such as Ag or an Ag alloy, a Cu-containing metal such as Cu or a Cu alloy, a Mo-containing metal such as Mo or a Mo alloy, Cr, Ta, or Ti. In alternative embodiments, the gate lines 121 may have a multi-layered structure including two conductive films (not shown), such as, for example, a lower film and an upper film, having different physical characteristics. Here, one of the two films may comprise a low resistivity metal such as an Al-containing metal to reduce a signal delay or a voltage drop. The other film may comprise a material such as Mo, a Mo-containing metal, or Cr, each of which has good physical, chemical, and electrical contact characteristics with other materials such as indium tin oxide (ITO) and indium zinc oxide (IZO). Examples of the combination of the two films include a lower Cr film and an upper Al—Nd alloy. However, it is understood that the gate lines 121 and the storage electrode lines (not shown) may comprise various metals or conductors. In this embodiment, in which the gate lines 121 include a lower film of Cr and an upper film of an Al—Nd alloy, the resistivity of the gate lines 121 may be about 4.5 $\Omega$. Here, it is further noted that, in still further embodiments of the invention, the gate lines 121 may have a triple-layered structure or a structure having yet additional layers.

A gate insulating layer 140, made of silicon nitride (SiNx), for example, is formed on the gate lines 121. A plurality of semiconductors 154 made of hydrogenated amorphous silicon (abbreviated to "a-Si") is formed on the gate insulating layer 140. A plurality of ohmic contacts 163 and 165 is formed on the semiconductors 154 with each of the semiconductors 154 being separated from one another. The ohmic contacts 163 and 165 comprise n+ hydrogenated a-Si heavily doped with an N-type impurity. Alternately, the ohmic contacts 163 and 165 may be made of silicide or other similar materials.

Pluralities of data lines 171 or D1-Dm (here, m is a positive integer) and drain electrodes 175 are formed on the ohmic contacts 163 and 165 and the gate insulating layer 140. The data lines 171 extend in a substantially vertical (longitudinal) direction and traverse the gate lines 121. The data lines 171 are each coupled to the first and second data signal transmission lines 520 and 530, and are each supplied with data voltages from the first and second data signal transmission lines 520 and 530 so as to transmit the data voltages to the pixels. Each of the data lines 171 includes a plurality of source electrodes 173 that project toward the gate electrodes 124. As shown in FIG. 5, portions Dj–3 or Dj–2 of the data lines 171 include wide end portions 179 to contact with the first even signal transmission lines 522 or the first odd signal transmission lines 532 and narrow end portions 172. The wide end portions 179 are formed on the peripheral area PA (e.g., peripheral areas PA3 or PA4), and the narrow end portions 172 extend toward the other of the third or fourth peripheral area PA3 or PA4. Meanwhile, the remaining portions Dj–1 or Dj of the data lines 171 are coupled to the second even signal transmission lines 524 or the second odd signal transmission lines 534 and include narrow end portions 172 that extend toward the third or fourth peripheral areas PA3 or PA4.

The drain electrodes 175 are separated from the data lines 171 and are disposed in opposition to the source electrodes 173 with respect to the gate electrodes 124.

In accordance with embodiments of the invention, each of the data lines 171 and the drain electrodes 175 may comprise a refractory metal such as Cr, Mo, Ta, Ti, and/or alloys thereof. In this embodiment, the data lines 171 and the drain electrodes 175 comprise a single layered structure of Mo having a resistivity of about 12 $\Omega$. However, it is understood that each of the data lines 171 and each of the drain electrodes 175 may also comprise a multilayered structure including a lower film made of a material such as Mo, a Mo alloy, Cr, or any other similar material, and an upper film made of an Al-containing metal.

A gate electrode 124, a source electrode 173, and a drain electrode 175 along with a semiconductor 154 together form a TFT, having a channel, with the semiconductor 154 being disposed between the source electrode 173 and the drain electrode 175. The ohmic contacts 163 and 165 are interposed between the underlying semiconductors 154 and the overlying source electrodes 173 and the drain electrodes 175. As such, the ohmic contacts 163 and 165 tend to reduce contact resistances between the semiconductors 154 and the overlying source electrodes 173.

A passivation layer 180 is formed on the data lines 171, the drain electrodes 175, and the exposed portions of the semiconductors 154. In an embodiment of the invention, the passivation layer 180 comprises a substantially flat and photosensitive organic material, a low dielectric insulating material, such as a-Si:C:O and a-Si:O:F, or an inorganic material such as silicon nitride (SiNx), or any other similar material. The passivation layer 180 includes a plurality of contact holes 189 which expose the drain electrodes 175.

A plurality of pixel electrodes 190 are formed on the passivation layer 180 and may comprise a transparent conductor such as ITO or IZO, or any other similar material. The pixel electrodes 190 are physically and electrically connected to the drain electrodes 175 through the contact holes 189 such that the pixel electrodes 190 receive the data voltages from the drain electrodes 175.

Next, a structure of the peripheral area PA of the TFT array panel 100 will be described. As discussed above, gate signal transmission lines 511 are formed on the third and fourth peripheral areas PA3 and PA4 of insulating substrate 110, which is made of a material such as transparent glass. The gate signal transmission lines 511 transmit gate control signals that are transmitted from the driver 400 to the gate driver 510. The gate signal transmission lines 511 generally extend in substantially horizontal directions and are formed of the same or a similar material (referred to as "a first metal") as the gate lines 121 to decrease the size of the third and the fourth peripheral areas PA3 and PA4. As such, a distance between the gate signal transmission lines 511 and the first or the second data signal transmission lines 520 or 530 may be relatively narrow. However, in alternate embodiments, the gate signal transmission lines 511 may be formed on the same layer as the data lines 171 and may be made of the same or a similar material (hereinafter referred to as "a second metal").

In addition, pluralities of first even and odd signal transmission lines 522 and 532 are formed on the third and fourth peripheral areas PA3 of the insulating substrate 110, respectively. The first even and odd signal transmission lines 522 and 532 transmit data voltages from the driver 400 to portions of the data lines 171 and mainly extend in a substantially horizontal direction. Each of the first even and odd signal transmission lines 522 and 532 includes an end portion 529 or 539 having a large area to contact with the end portion 179 of the corresponding data line 171.

The end portions 529 of the first even signal transmission lines 522 are formed on areas corresponding to the end portions 179 of the data lines 171 formed on the third peripheral area PA3, and the end portions 539 of the first odd signal transmission lines 532 are formed on areas corresponding to the end portions 179 of the data lines 171 formed on the fourth peripheral area PA4. As shown in FIG. 5, sizes of the wide end portions 529 and 539 of the first even and odd signal transmission lines 522 and 532 are smaller than those of the wide end portions 179 of the corresponding data lines 171. However, it is understood that this construction may be varied.

As shown in FIG. 6, the first even and the first odd signal transmission lines 522 and 532 comprise the first metal, and are formed on the same layer as the gate lines 121.

The gate insulating layer 140 is formed on the first even and odd signal transmission lines 522 and 532 and includes a plurality of contact holes 144, 146, 148, 143, 145 and 147 exposing the end portions of the first even and odd signal transmission lines 522 and 532, respectively. Here, sizes S2, S4, S6, S1, S3 and S5 of exposed portions of the first even and odd signal transmission lines 522 and 532 ("exposed sizes S2, S4, S6, S1, S3 and S5"), that are exposed through the contact holes 144, 146, 148, 143, 145 and 147, increase as a distance from the driver 400 to each of the contact holes 144, 146, 148, 143, 145 and 147 increases.

The first even and odd signal transmission lines 522 and 532 are connected to the wide end portions 179 of the corresponding data lines 171 through the corresponding contact hole 144, 146, 148, 143, 145 or 147 to transmit data voltages from the driver 400 to the corresponding data lines 171. As such, contact sizes of the end portions 529 and 539 of the first even and odd signal transmission lines 522 and 532 and the wide end portions 179 of the corresponding lines 171 are substantially the same as the exposed sizes S2, S4, S6, S1, S3 and S5. Thus, the contact sizes also increase as the distance from the driver 400 increases. Here, it is understood that, in alternate embodiments of the invention, the shape or number of the contact holes 144, 146, 148, 143, 145 and 147 may be varied when the above-noted condition between the exposed sizes S2, S4, S6, S1, S3 and S5 and the distance from the driver 400 is satisfied.

When the distance from the driver 400 increases, the contact sizes of the end portions 529 and 539 of the first even and odd signal transmission lines 522 and 532 and the end portions 179 of the data lines 171 increases and contact resistances between the end portions 529 and 539 and the wide end portions 179 decrease accordingly.

Pluralities of second even and odd signal transmission lines 524 and 534 are formed on the third peripheral areas PA3 and PA4 of the gate insulating layer 140, respectively. The first even and odd signal transmission lines 524 and 534 transmit data voltages from the driver 400 to the remaining data lines 171. The second even and odd signal transmission lines 524 and 534 extend in a substantially horizontal direction and then extend in a substantially vertical direction to directly connect to the corresponding data lines 171. The passivation layer 180 is formed on the second even and odd signal transmission lines 524 and 534.

As shown in FIG. 6, the second even and odd signal transmission lines 524 and 534 are made of the second metal and they are formed on the same layer as the data lines 171. In alternative embodiments of the invention, the first even and odd signal transmission lines 522 and 532 may be made of the second metal that is the same or similar metal as that of the data lines 171, and the second even and odd signal transmission lines 524 and 534 may be made of the first metal that is the same or similar metal as that of the gate lines 121.

As described, when the first even and odd signal transmission lines 522 and 532 are formed on a different layer from the second even and odd signal transmission lines 524 and 534, distances between the first even and odd signal transmission lines 522 and 532 and the second even and odd signal transmission lines 524 and 534 decrease, respectively. Thus, the sizes of the third and fourth peripheral areas PA3 and PA4 also decrease.

In alternative embodiments of the invention, when the first even and odd signal transmission lines 522 and 532 overlap with the second even and odd signal transmission lines 524 and 534, respectively, the sizes of the third and fourth peripheral areas PA3 and PA4 further decrease. However, when an amount of an overlap is more than a predetermined amount, signal distortion may occur in the signal transmission lines 522, 532, 524 and 524, due to parasitic capacitances formed between the first even and odd signal transmission lines 522 and 532 and the second even and odd signal transmission lines 524 and 534, respectively. Thus, in an embodiment of the invention, the amount of the overlap is maintained to be less overlap than the predetermined amount. As such, the signal distortion is reduced or effectively prevented.

In alternative embodiments of the invention, the first data signal transmission lines 520 may be formed on the fourth peripheral area PA4, and the second data signal transmission lines 530 may be formed on the third peripheral area PA3. In addition, all of the first and second data signal transmission lines 520 and 530 may be formed on only one of the third and fourth peripheral areas PA3 or PA4.

Since the first even and odd signal transmission lines 522 and 532 are made of the first metal, and the second even and odd signal transmission lines 524 and 534 are made of the second metal, the resistivities of the first signal transmission lines 522 and 532 and the second signal transmission lines 524 and 534 are different. Thus, resistance differences between the first signal transmission lines 522 and 532 and the second signal transmissions lines 524 and 534 occur. In addition, due to length differences between the first data signal transmission lines 520 and the second data signal transmission lines 530, wire resistance differences between the first data signal transmission lines 520 and the second data signal transmission lines 530 occur. The resistance differences result in different RC delays. Thus, signal distortion may be aggravated to cause further deteriorations in image quality. Thus, reductions in the RC delay differences to increase image quality are necessary.

In this embodiment, in order to for reduce the RC delay differences, as described above, the exposed sizes S1, S2, S3, S4, S5 and S6 of the contact holes 143, 144, 145, 146, 147 and 148 differ from each other in accordance with their respective distances from the driver 400. That is, the exposed sizes S2, S4, S6, S1, S3 and S5 of the first even and odd signal transmission lines 522 and 532 increase as the distance from the driver 400 increases.

That is, as the distance from the driver 440 increases, the contact resistances between the first even and odd signal transmission lines 522 and 532 and the corresponding data lines 171 decrease so as to compensate for the resistance increment due to the length increment of the first even and odd signal transmission lines 522 and 532. Accordingly, the resistance differences caused by the length differences of the first even and odd signal transmission lines 522 and 532 decrease. The exposed sizes S1, S2, S3, S4, S5 and S6 are defined so as to minimize the resistance differences due to the length differences of the first even and odd signal transmission lines 522 and 532.

In addition, when the end portions 529 and 539 of the first even and odd signal transmission lines 522 and 532, which are made of the first metal having low resistivity, are coupled to the wide end portions 179 of the corresponding data lines 171 through the contact holes 143, 144, 145, 146, 147 and 148 that have different sizes, respectively, contact resistances occur such that the total respective resistances increase. By adjusting the resistance increment, resistance differences between the second even and odd signal transmission lines 524 and 534, which are made of the second metal having high resistivity, and the first even and odd signal transmission lines 522 and 532 are minimized.

Therefore, the resistance differences due to a material difference of the first even and odd signal transmission lines 522 and 532 and the second even and odd signal transmission lines 524 and 534 and the length differences between the signal transmission lines 522, 532, 524 and 534 are compensated for such that the total resistance of the signal transmission lines 522, 532, 524 and 534 are substantially constant. In addition, the RC delay differences of the data voltages applied to the data lines 171 is reduced by the constant resistance of the signal transmission lines 522, 532, 524 and 534 to result in an improvement of image quality.

A manufacturing method of the exemplary TFT array panel 100, according to an exemplary embodiment of the present invention, will now be described with reference to FIGS. 8 to 13 as well as FIGS. 2 to 7.

Figure 9:
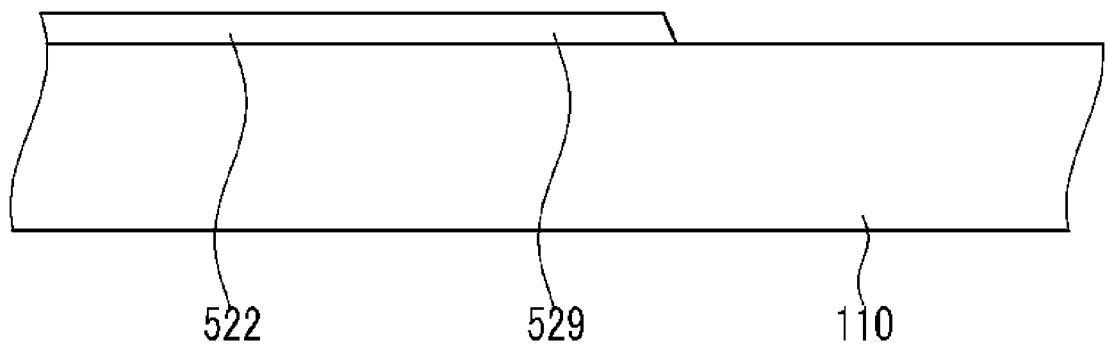
FIGS. 9, 11 and 13 are sectional views of the TFT array panel shown in FIGS. 8, 10 and 12 taken along lines IX-IX, XI-XI and XIII-XIII, respectively.
Figure 10:
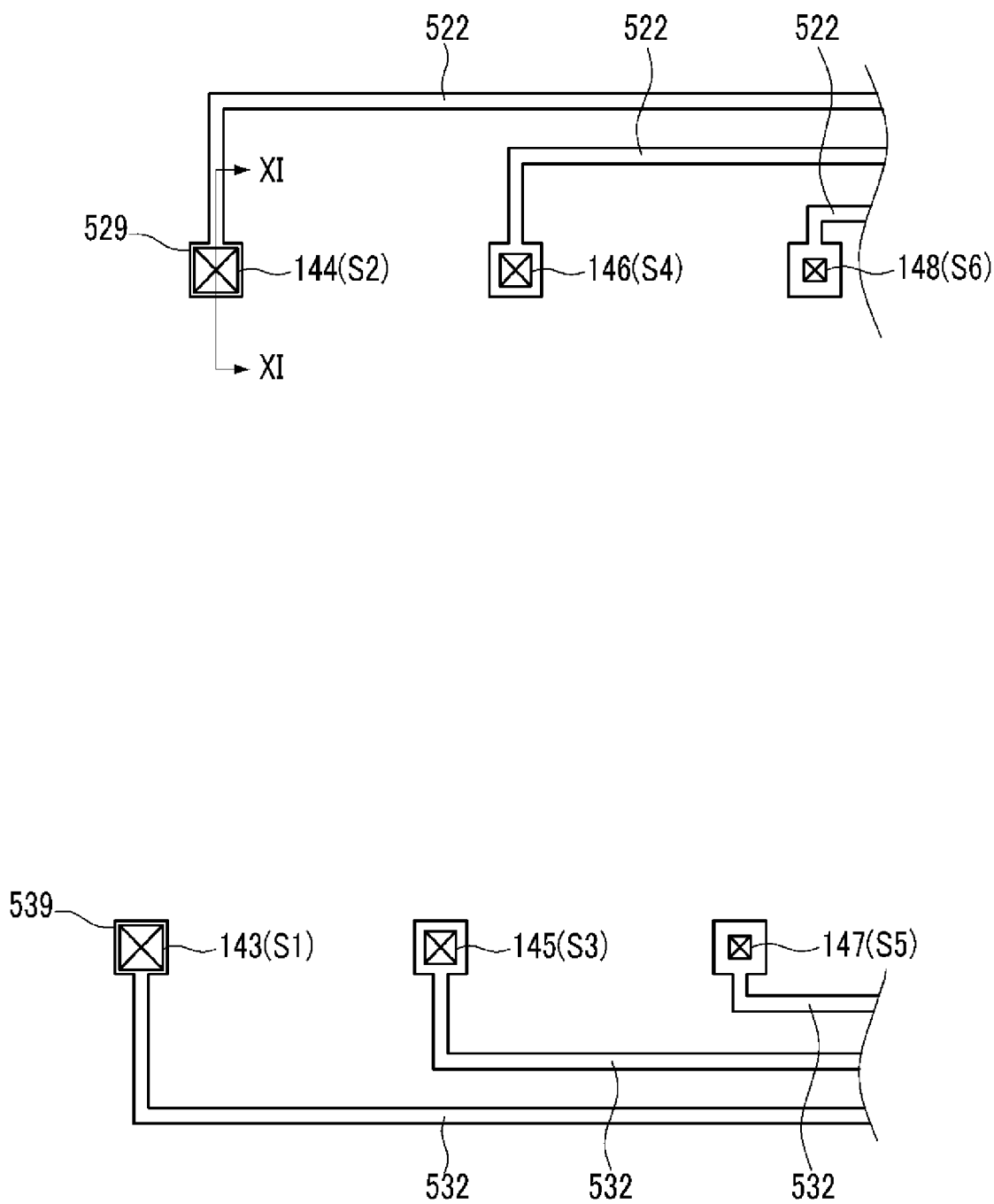
Figure 11:
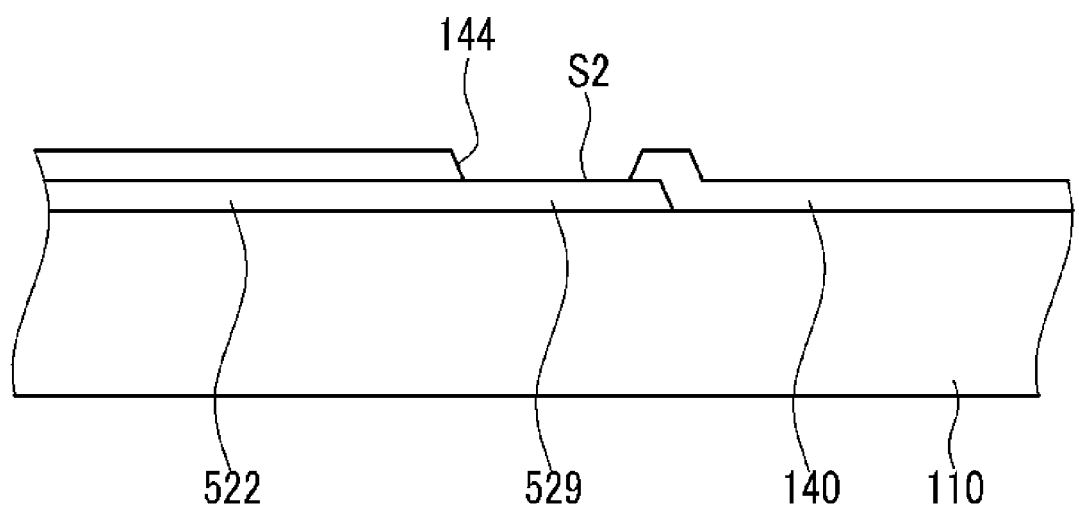
Figure 12:
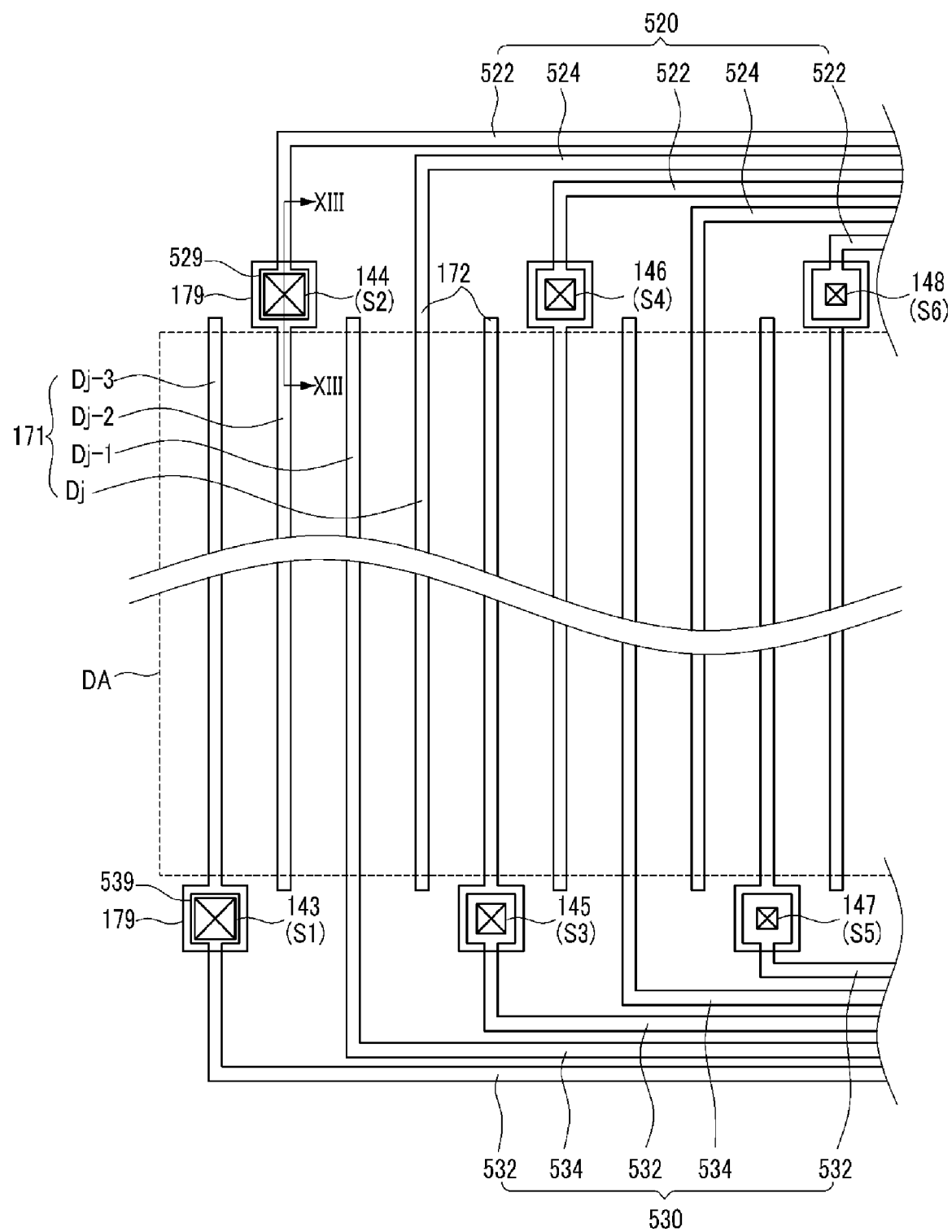
Figure 13:
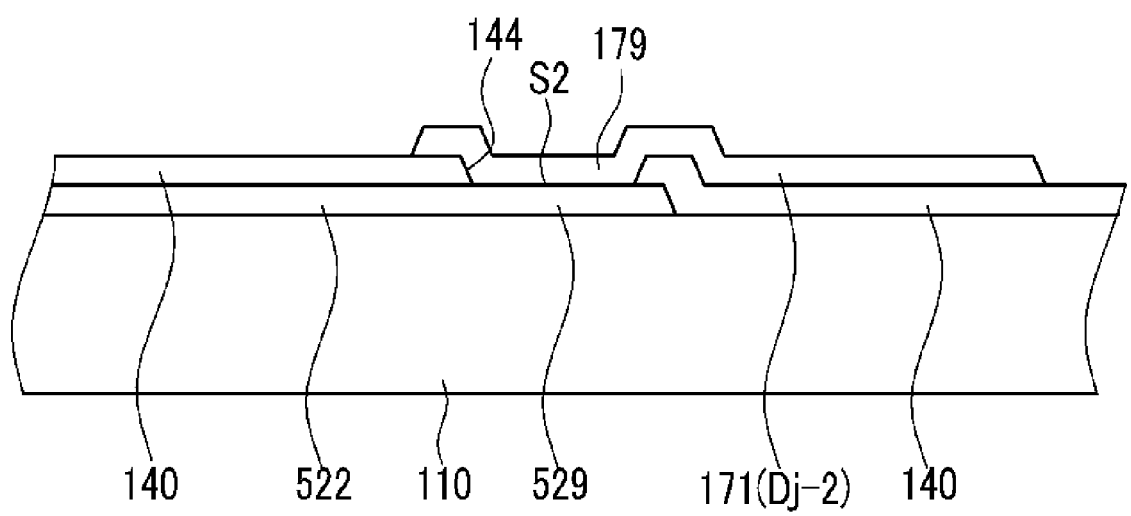

FIGS. 8, 10 and 12 are layout views of the TFT array panel shown in FIGS. 5 to 7 in intermediate steps of a manufacturing method thereof according to a first embodiment of the present invention, and FIGS. 9, 11 and 13 are sectional views of the TFT array panel shown in FIGS. 5, 10 and 12 taken along lines IX-IX, XI-XI and XIII-XIII, respectively.

First, a conductive layer of a lower layer made of Cr and an upper layer made of an Al—Nd alloy is formed on an insulating substrate 110 by sputtering or other similar methods. Then, the conductive layer is etched to form a plurality of first even and odd signal transmission lines 522 and 532 having wide end portions 529 and 539 on the third and fourth peripheral areas PA3 and PA4, respectively, as shown in FIGS. 8 and 9, and to form a plurality of gate lines 121 having gate electrodes 124, as shown in FIGS. 2 to 4.

Next, a gate insulating layer 140, an intrinsic a-Si layer (not shown) that is not doped with an impurity, and an extrinsic a-Si layer (not shown) that is doped with an impurity are sequentially deposited by plasma enhanced chemical vapor deposition (PECVD) on the gate lines 121 and the first even and odd signal transmission lines 522 and 532. The gate insulating layer 140 may be made of silicon nitride (SiNx). Referring to FIGS. 3 and 4, the extrinsic a-Si layer and the intrinsic a-Si layer are etched by photo-etching to form semiconductor patterns (not shown).

Referring to FIGS. 10 and 11, the gate insulating layer 140 is etched by photo-etching to form contact holes 144, 146 and 148 that expose the wide end portions 529 of the first even signal transmission lines 522, respectively and a plurality of contact holes 143, 145 and 147 exposing the wide end portions 539 of the first even signal transmission lines 532, respectively. The exposed sizes S2, S4 and S6 through the contact holes 144, 146 and 148 differ from each other, and the exposed sizes S1, S3 and S5 through the contact holes 143, 145 and 147 also differ from each other. When photo-etching, the different exposed sizes S2, S4, S6, S1, S3 and S5 of the contact holes 143, 144, 145, 146, 147 and 148 may be formed by using photomasks having different patterns such as slits or by adjusting exposure intensities or times.

A conductive layer, for example made of Mo, is formed on the semiconductor pattern and the gate insulating layer 140 by sputtering.

Referring to FIGS. 2 to 4 and FIGS. 12 and 13, the conductive layer is etched to form a plurality of data lines 171 having source electrodes 173, wide end portions 179, and narrow end portions 172, a plurality of drain electrodes 175, and a plurality of second even and odd signal transmission lines 524 and 534. At this time, the wide end portions 179 of the plurality of data lines 171 contact the end portions 529 and 539 of the first even and odd signal transmission lines 522 and 532 with the different exposed sizes S2, S4, S6, S1, S3 and S5, respectively.

The exposed portions of the semiconductor patterns that are not covered by the source electrodes 173 and the drain electrodes 175 are removed to form the ohmic contacts 163 and 165 and to expose portions of the underlying intrinsic a-Si layers that operate as semiconductors 154.

Referring to FIGS. 3 to 7, a passivation layer 180 is formed on the data lines 171, and on the second even and odd signal transmission lines 524 and 534 and the exposed gate insulating layer 140. The passivation layer 180 may have a single-layered structure or a multi-layered structure. The passivation layer 180 may be made of an organic material, an insulating material, an inorganic material or a combination thereof. The organic material may be relatively flat and photosensitive. The insulating material may be made of a material having a low dielectric constant, for example a-Si:C:O, a-Si:O:F, etc., and be formed by PECVD. The inorganic material may include silicon nitride (SiNx), or other similar materials.

A photoresist film (not shown) is coated on the passivation layer 180. The photoresist film is exposed to light through a photomask (not shown) and developed to form a plurality of contact holes 189 exposing portions of the drain electrodes 175. Finally, as shown in FIGS. 3 and 4, a transparent conductive layer such as ITO or IZO is formed on the passivation layer 180 by sputtering, etc., and is photo-etched to form a plurality of pixel electrodes 190.

SECOND EMBODIMENT

Figure 14:
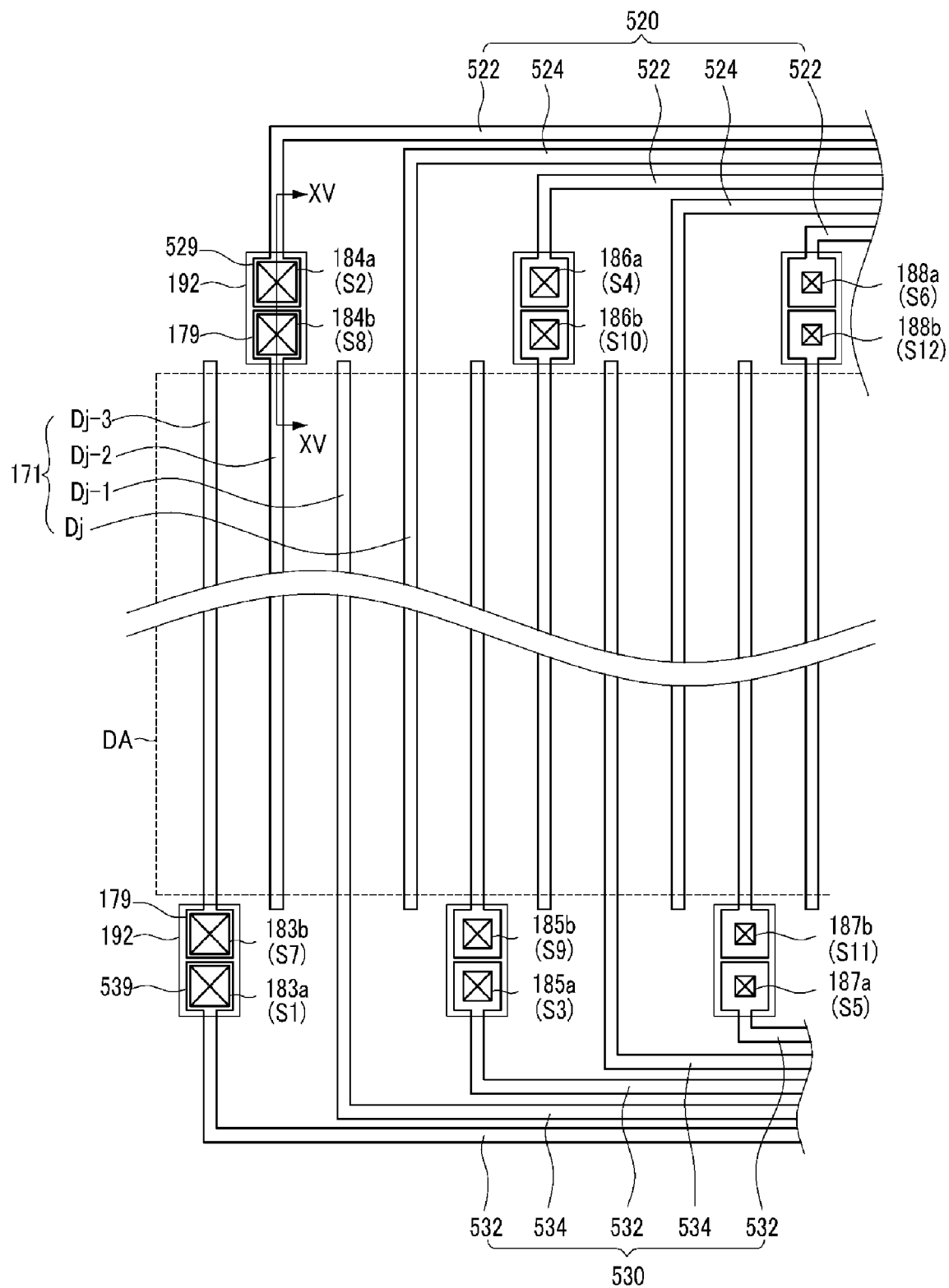
FIG. 14 is a layout view of data lines and signal transmission lines of a TFT array panel according to a second exemplary embodiment of the present invention.
Figure 15:
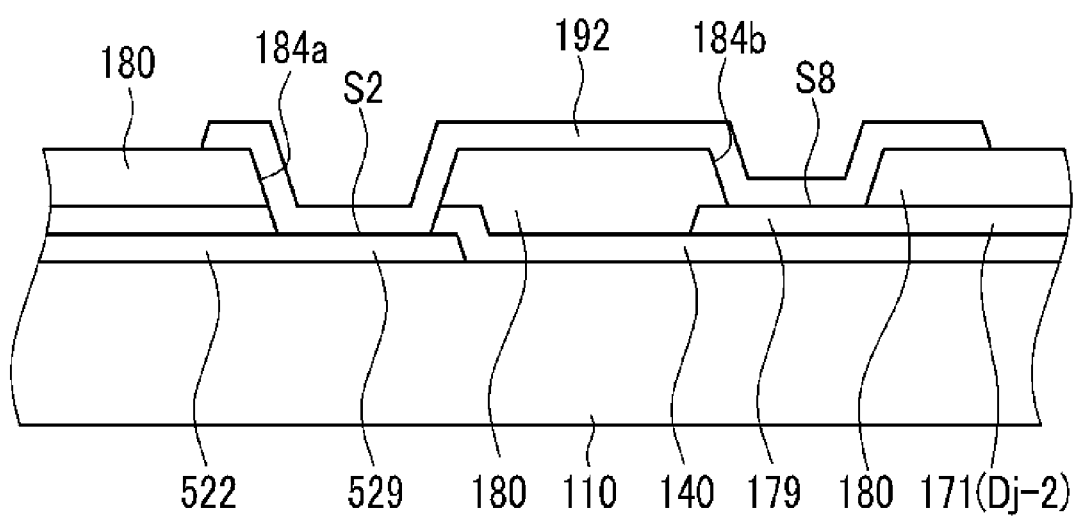
FIG. 15 is a sectional view of the TFT array panel shown in FIG. 14 taken along a line XV-XV.

With reference to FIGS. 14 and 15, a TFT array panel according to a second embodiment of the present invention will be described.

A schematic view of the TFT array panel, according to this embodiment, appears similar to the schematic view of FIG. 2. As compared with FIGS. 5 and 7, elements performing the same operations are indicated as the same reference numerals and detailed descriptions thereof are omitted.

FIG. 14 is a layout view of data lines and signal transmission lines of a TFT array panel according to a second exemplary embodiment of the present invention, and FIG. 15 is a sectional view of the TFT array panel shown in FIG. 14 taken along a line XV-XV.

As compared with FIGS. 5 and 6, the TFT array panel further includes a plurality of connecting members 192. First even and odd signal transmission lines 522 and 532 are connected to corresponding data lines 171 through the connecting members 192, respectively. Here, in the TFT array panel, according to this embodiment, ends of the first even and odd signal transmission lines 522 and 532 and the corresponding data lines 171 connected through the connecting members 192 include wide end portions 529, 539 and 179, respectively, each of which has a large area. In detail, the wide end portions 529 and 539 are spaced apart from the wide end portions 179 of the corresponding data lines 171, respectively, and sizes of the wide end portions 529 and 539 may be substantially the same as those of the wide end portions 179. In addition, a passivation layer 180 and a gate insulating layer 140 each include a plurality of first contact holes 183a, 184a, 185a, 186a, 187a and 188a exposing the wide end portions 529 and 539. Further, the passivation layer 180 includes a plurality of second contact holes 183b, 184b, 185b, 186b, 187b and 188b exposing the wide end portions 179.

As in the first embodiment discussed above, exposed sizes S1, S3, S5, S2, S4 and S6 of the wide end portions 529 and 539 of the first even and odd signal transmission lines 522 and 532 through the first contact holes 183a, 185a, 187a, 184a, 186a and 188a, respectively, and exposed sizes S7, S9, S11, S8, S10 and S12 of the wide end portions 179 of the data lines 171 through the second contact holes 183b, 185b, 187b, 184b, 186b and 188b, respectively, increase as their respective distances from the driver 400 increases.

The connecting members 192 are formed on the same layer and are made of the same or a similar material as the pixel electrodes 190. Each of the connecting members 192 contacts a wide end portion 529 or 539 and a wide end portion 179 of a corresponding data line 171 through the first and second contact holes 184a, 186a, 188a, 183a, 185a, 187a, 184b, 186b, 188b, 183d, 185b, or 187b. Here, contact sizes of the wide end portions 529 and 539 and the wide end portions 179 of the corresponding data lines 171 are substantially the same as the exposed sizes S2, S4, S6, S1, S3 and S5. Thus, the contact sizes also increase as a distance from the driver 400 increases.

While a manufacturing method of the TFT array panel, according to this embodiment, is substantially similar to that of the TFT array panel according to the first embodiment discussed above, the manufacturing method of the TFT array panel, according to this embodiment, further includes forming the first and second contact holes 183a, 184a, 185a, 186a, 187a, 188a, 183b, 184b, 185b, 186b, 187b and 188b and forming the connecting members 192. That is, after the formation of the passivation layer 180, the first and second contact holes 183a, 184a, 185a, 186a, 187a, 188a, 183b, 184b, 185b, 186b, 187b and 188b are formed along with the contact holes 189 exposing the drain electrodes 175. The connecting members 192 are then formed by photo-etching when forming the pixel electrodes 190.

THIRD EMBODIMENT

Figure 16:
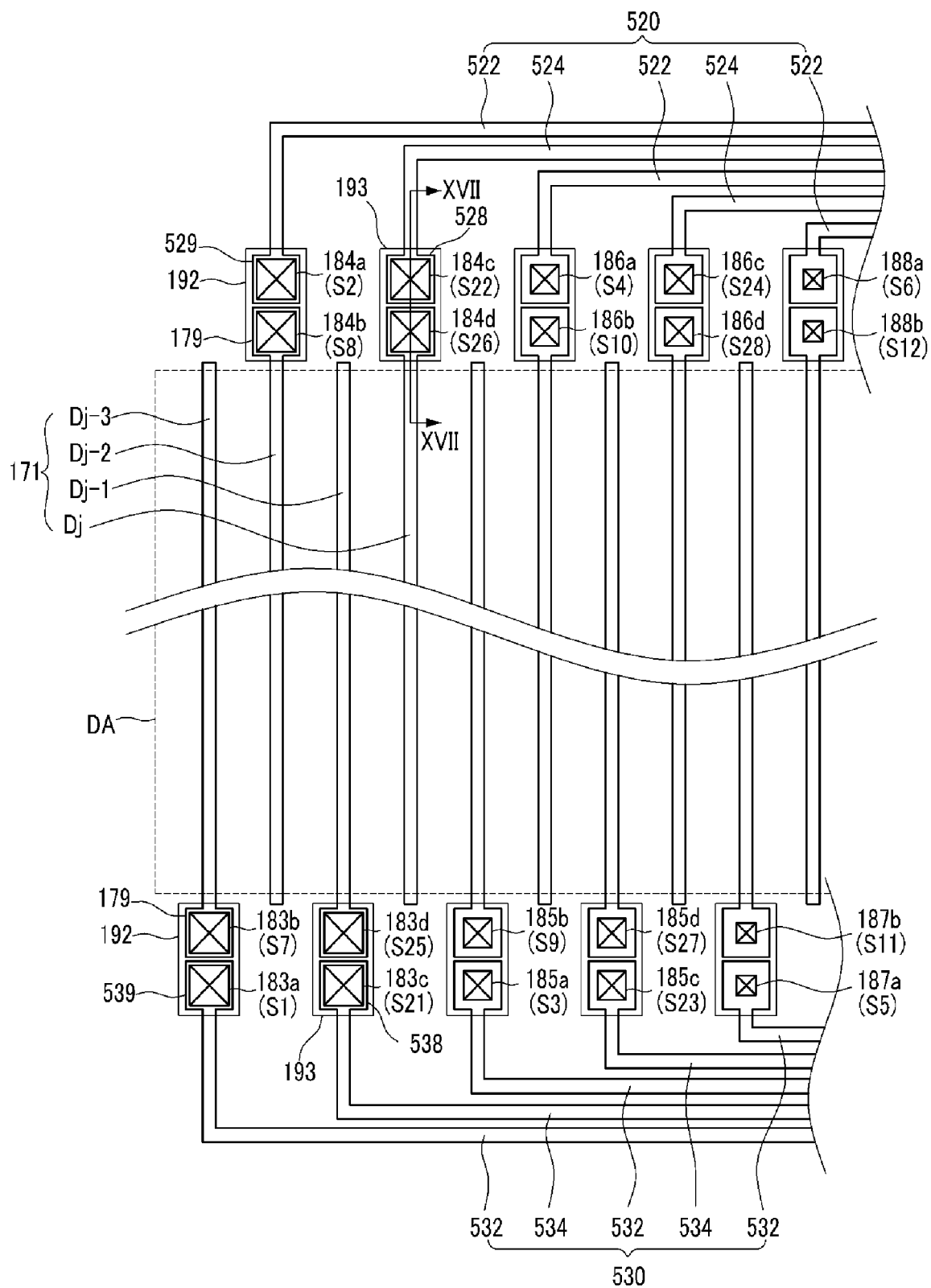
FIG. 16 is a layout view of data lines and signal transmission lines of a TFT array panel according to a third embodiment of the present invention.
Figure 17:
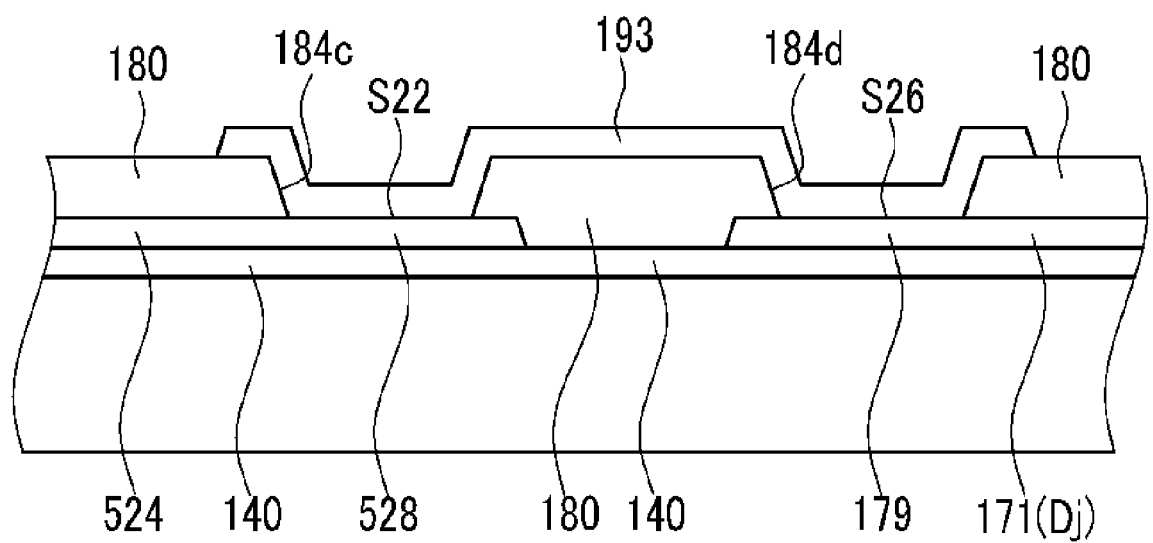
FIG. 17 is a sectional view of the TFT array panel shown in FIG. 16 taken along a line XVII-XVII.

With reference to FIGS. 16 and 17, a TFT array panel, according to a third embodiment of the present invention, will be described.

A schematic view of the TFT array panel, according to this embodiment, appears similar to the schematic view of FIG. 2. As compared with FIGS. 14 and 15, the elements performing the same operations are indicated by the same reference numerals and detailed descriptions thereof are omitted.

FIG. 16 is a layout view of data lines and signal transmission lines of a TFT array panel according to a third embodiment of the present invention, and FIG. 17 is a sectional view of the TFT array panel shown in FIG. 16 taken along a line XVII-XVII.

Unlike the TFT array panel shown in FIGS. 14 and 15, referring to FIGS. 16 and 17, the TFT array panel further includes a plurality of connecting members 193 through which second even and odd signal transmission lines 524 and 534 as well as first even and odd signal transmission lines 522 and 532 contact corresponding data lines 171.

Here, the second even and odd signal transmission lines 524 and 534 contact the data lines 171 through the connecting members 193 in a similar manner as that of the first even and odd signal transmission lines 522 and 532 and the data lines 171 through the connecting members 192. However, the first even and odd signal transmission lines 522 and 532 are made of the same or similar material as and are formed on the same layer as the gate lines 121, while the second even and odd signal transmission lines 524 and 534 are made of the same or similar material as and are formed on the same layer as the data lines 171.

As such, an end structure of the second even and odd signal transmission lines 524 and 534 and the corresponding data lines 171 is substantially similar to that of the first even and odd signal transmission lines 522 and 532 and the corresponding data lines 171. That is, one of the ends of each of the second even and odd signal transmission lines 524 and 534 and the corresponding data lines 171 has a wide end portion 528, 538, or 179 having a large area.

In addition, a passivation layer 180 further includes a plurality of third contact holes 184c, 186c, 183c and 185c exposing the wide end portions 528 and 538 of the second even and odd signal transmission lines 524 and 534 and a plurality of fourth contact holes 184d, 186d, 183d and 185d exposing the wide end portions 179 of the corresponding data lines 171. Like the exposed sizes S2, S4, S6, S1, S3, S5, S8, S10, S12, S7, S9 and S11 shown in FIG. 14, exposed sizes S22, S24, S21, S23, S26, S28, S25 and S27 of the wide end portions 528, 538 and 179 increase as a distance from the driver 400 increases.

The connecting members 193 are made of the same or similar material as and are formed on the connecting members 192, that is, the pixel electrodes 190. Similar to the connecting members 192, each of the connecting members 193 contacts a wide end portion 528 or 538 and a wide end portion 179 of a corresponding data line 171 through the contact hole 184c, 186c, 183c, 185c, 184d, 186d, 183d or 185d. In addition, contact sizes of the end portions 528 and 538 of the second even and odd signal transmission lines 524 and 534 and the end portions 179 of the corresponding lines 171 are substantially similar to the exposed sizes S22, S24, S21, S23, S26, S28, S25 and S27. Thus, the contact sizes also increase as a distance from the driver 400 increases.

According to the TFT array panel shown in FIGS. 16 and 17, resistance differences caused by length differences of the second even and odd signal transmission lines 524 and 534 as well as the first even and odd signal transmission lines 522 and 532 are reduced to decrease resistance differences of the data signal transmission lines 520 and 530.

A manufacturing method of the TFT array panel according to the third embodiment is substantially similar to that of the second embodiment. However, in the TFT array panel of the third embodiment, when data lines 171 having the wide end portions 179 are formed, the second even and odd signal transmission lines 532 and 534 having the wide end portions 528 and 538 are also formed. A passivation layer 180 including the third contact holes 184c, 186c, 183c and 185c and the fourth contact holes 184d, 186d, 183d and 185d is formed. Next, when forming the pixel electrodes 190, the connecting members 193 are formed along with the connecting members 192.

FOURTH EMBODIMENT

A TFT array panel according to the fourth embodiment of the present invention will now be described with reference to FIG. 18. The description of the TFT array panel of this embodiment will be given as a comparison with FIGS. 5 and 16.

A schematic view of the TFT array panel, according to this embodiment, appears similar to the schematic view of FIG. 2. As compared with FIGS. 5 to 7 and 16, elements performing the same operations are indicated by the same reference numerals, and the detailed description thereof is omitted.

Figure 18:
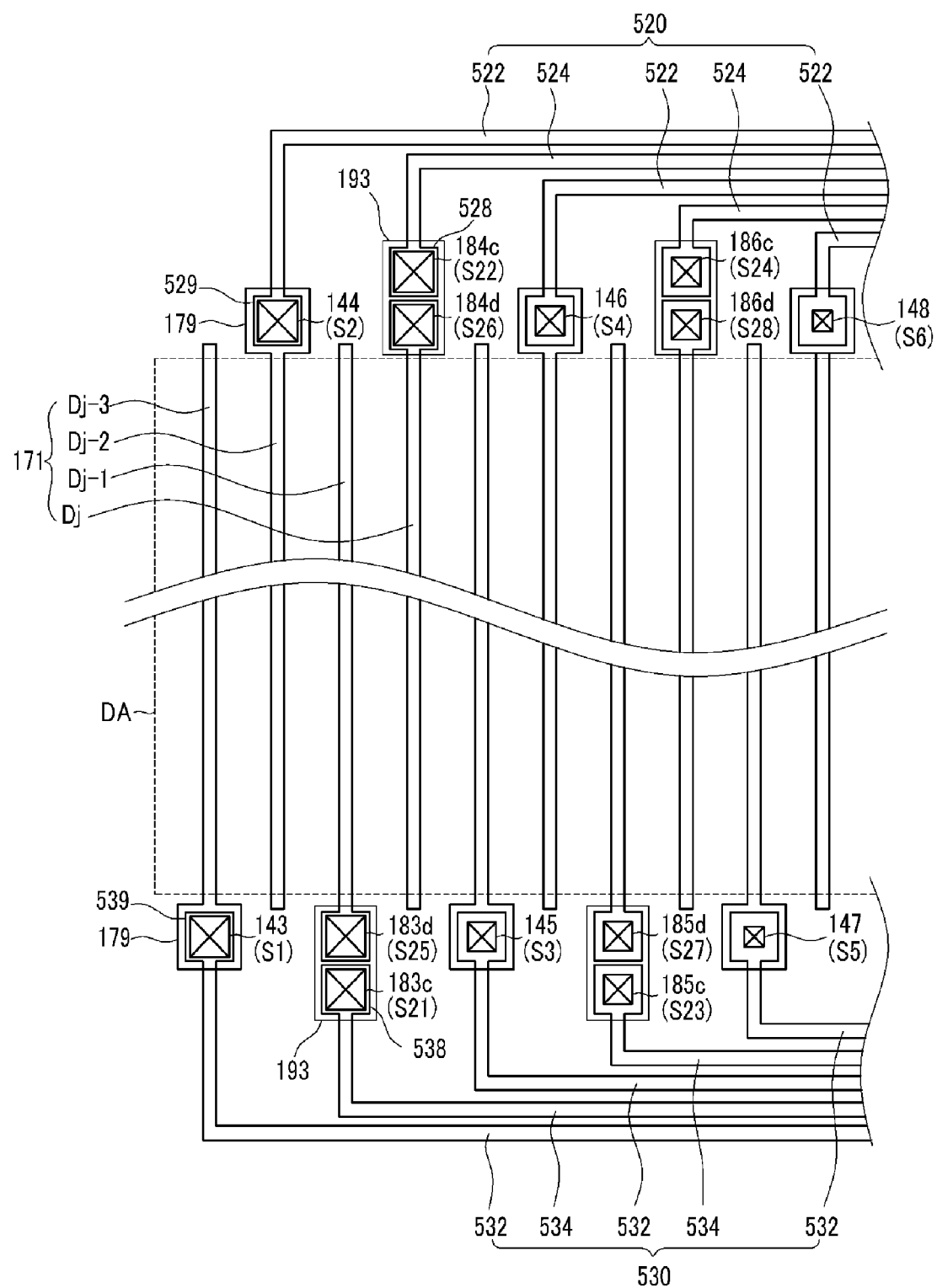
FIG. 18 is a layout view of data lines and signal transmission lines of a TFT array panel according to a fourth embodiment of the present invention.

FIG. 18 is a layout view of data lines and signal transmission lines of a TFT array panel according to a fourth embodiment of the present invention.

Referring to FIG. 18, a connection manner of the first even and odd signal transmission lines 522 and 532 and the data lines 171 corresponding thereto is substantially similar to that of the TFT array panel shown in FIG. 5. In addition, connection manners of the second even and odd signal transmission lines 524 and 534 and the data lines 171 corresponding thereto are substantially similar to that of the TFT array panel shown in FIG. 16. Thus, a detailed description of the connection manner is omitted.

According to the TFT array panel shown in FIG. 18, resistance differences caused by length differences of the second even and odd signal transmission lines 524 and 534 as well as the first even and odd signal transmission lines 522 and 532 are reduced to reduce resistance differences of the data signal transmission lines 520 and 530.

FIFTH EMBODIMENT

A TFT array panel according to a fifth embodiment of the present invention will be described with reference to FIGS. 19 to 22. A description of the TFT array panel of this embodiment will be given with a comparison with FIGS. 2 to 7.

Figure 19:
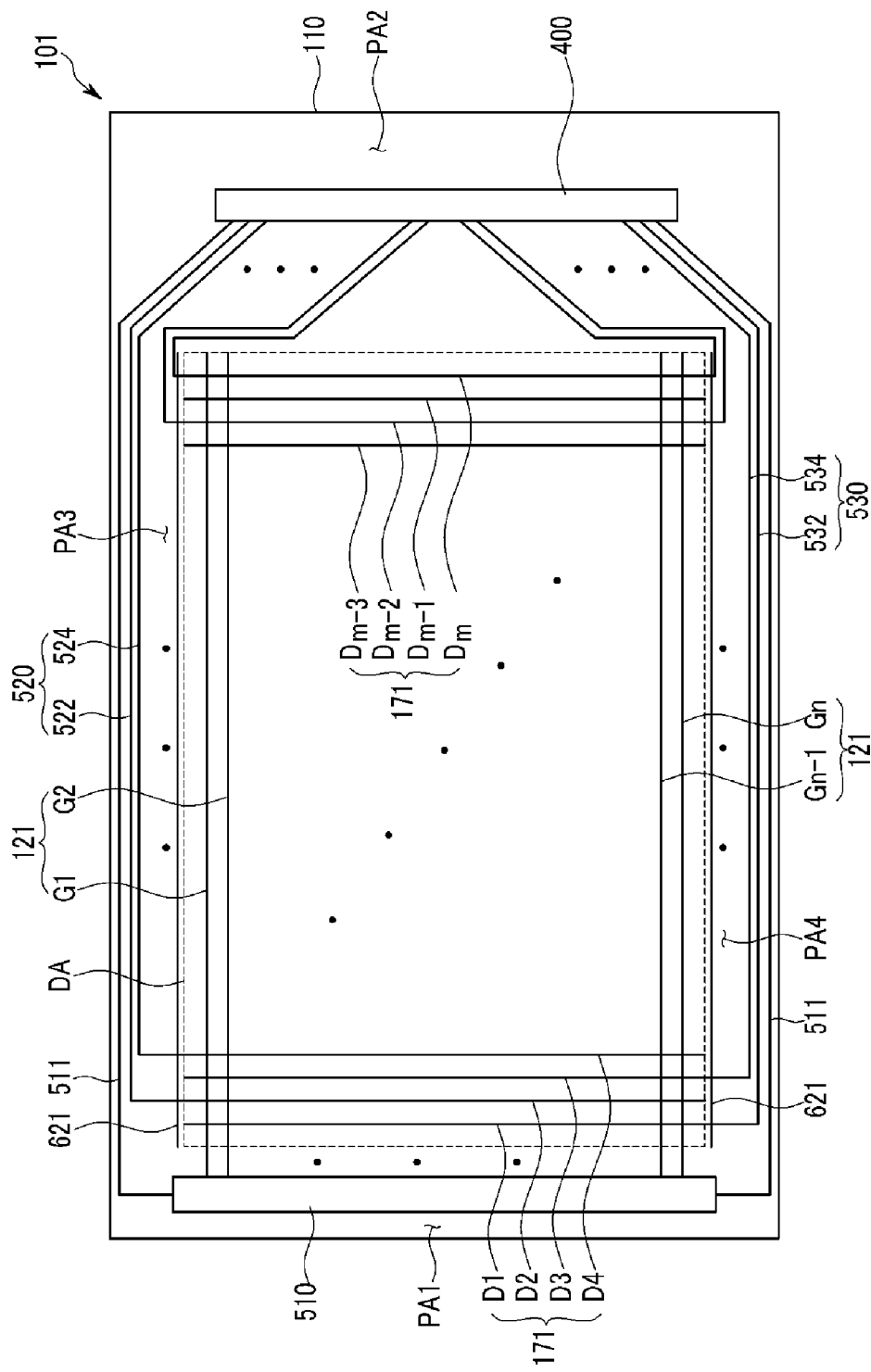
FIG. 19 is a schematic view of a TFT array panel according to a fifth embodiment of the present invention.
Figure 20:
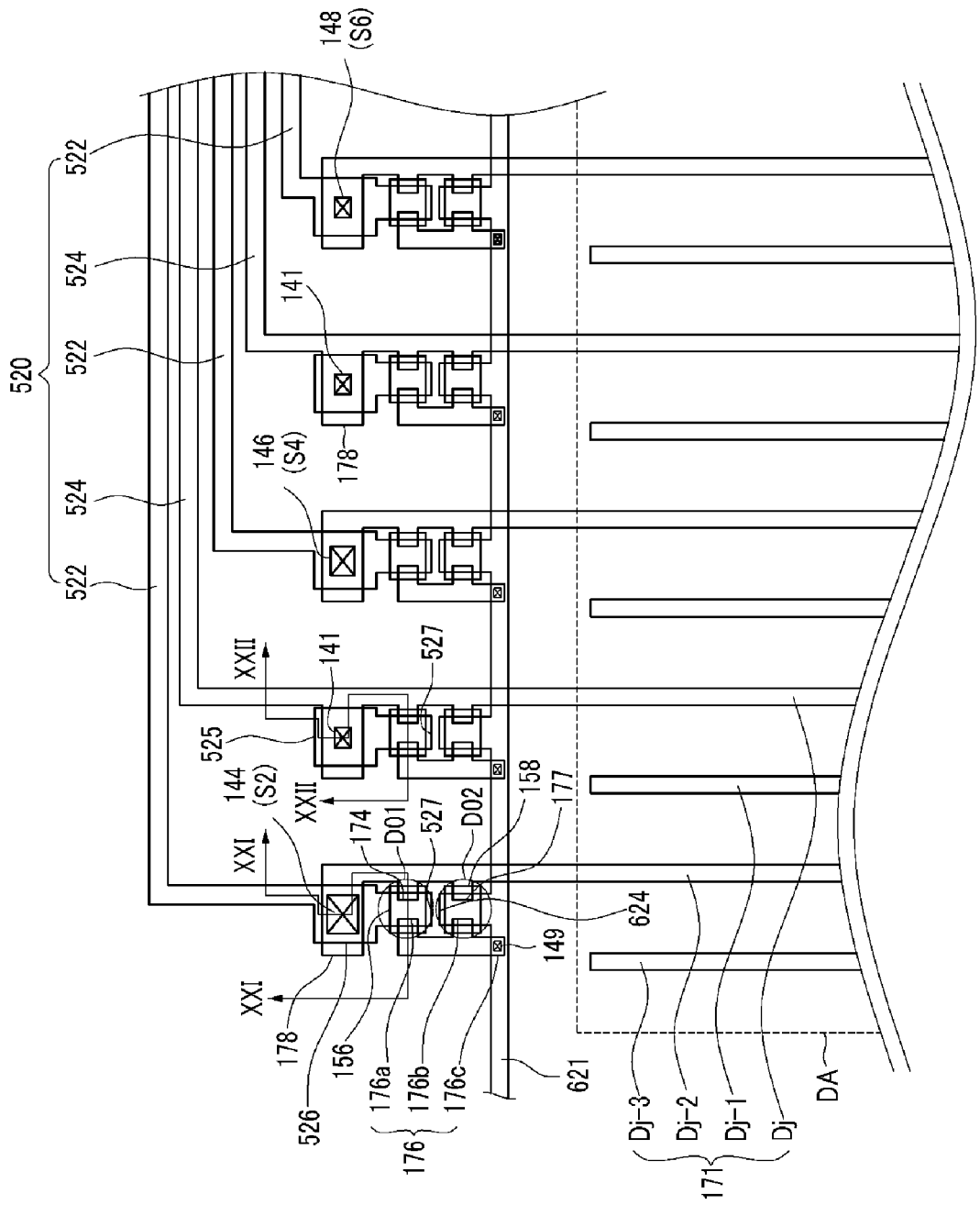
FIG. 20 is a layout view of data lines and signal transmission lines of the TFT array panel shown in FIG. 19.

FIG. 19 is a schematic view of a TFT array panel according to a fifth embodiment of the present invention. FIG. 20 is a layout view of data lines and signal transmission lines of the TFT array panel shown in FIG. 19, and FIGS. 21 and 22 are sectional views of the TFT array panel shown in FIG. 20 taken along lines XXI-XXI and XXII-XXII.

As compared with FIGS. 2 and 5, referring to FIGS. 19 to 22, the TFT array panel of this embodiment further includes two dummy wires 621, one of which is formed on third peripheral areas PA3 and the other being formed on fourth peripheral areas PA4, a plurality of connection wires 176 connected to the two dummy wires 621, and a plurality of first and second diodes DO1 and DO2 coupled to the connection wires 176 to disperse static electricity.

The connection relationship of the first and second even signal transmission lines 522 and 524, the even-numbered data lines 171, the dummy wire 621, and the first and second diodes DO1 and DO2, shown in FIG. 20, is adapted to the first and second odd signal transmission lines 532 and 534, the odd-numbered data lines 171, and the dummy wire 621 that is also formed on the fourth peripheral area PA4.

Figure 21:
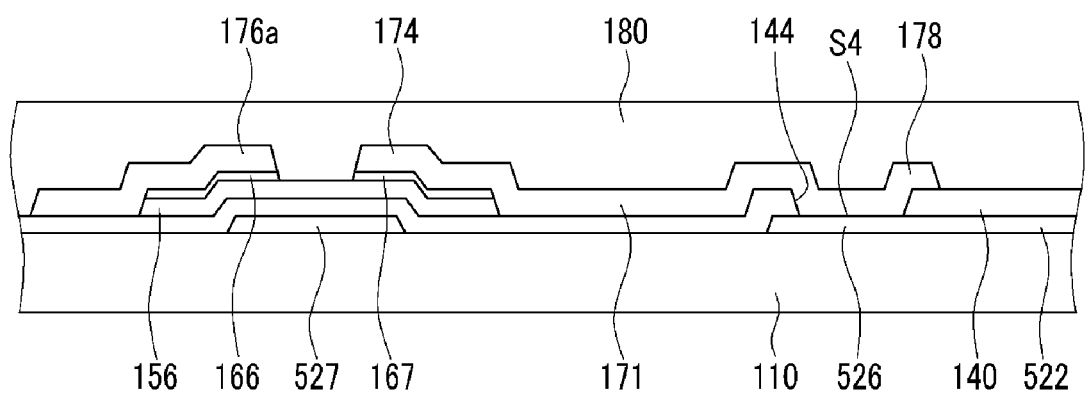
FIGS. 21 and 22 are sectional views of the TFT array panel shown in FIG. 20 taken along lines XXI-XXI and XXII-XXII.
Figure 22:
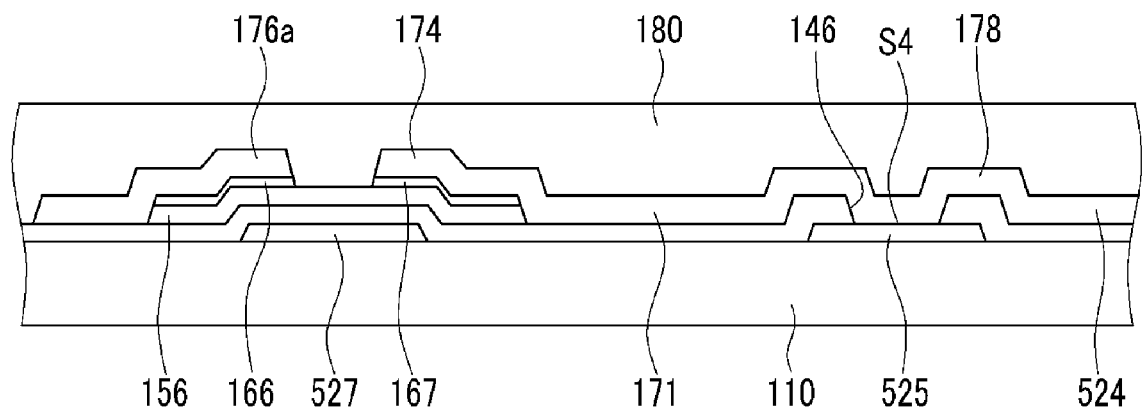

Referring to FIGS. 20 to 22, only a detailed description of the first and second even signal transmission lines 522 and 524, the even-numbered data lines 171, the dummy wire 621, and the first and second diodes DO1 and DO2 formed on the third peripheral area PA3 will be given. As compared with the above embodiments, elements performing the same operations are indicated by the same reference numerals, and detailed descriptions thereof are omitted.

The dummy wire 621 extends in a substantially horizontal direction. The dummy wire 621 includes a plurality of second control electrodes 624. The dummy wire 621 is made of the same or similar materials as and is formed on the same layer as the gate lines 121. One dummy wire 621 is formed between the first data signal transmission lines 520 and the gate lines 121, and another dummy wire 621 is formed between the second data signal transmission lines 530 and the gate lines 121.

A plurality of conductive islands 525 are formed on the same layer as the gate lines 121. Each of the conductive islands 525 is connected to an end portion 178 of the corresponding data line 171 connected to the second even signal transmission lines 524 through a contact hole 141 formed on the gate insulating layer 140. Referring to FIG. 20, the end portions 178 of the data lines 171 are expanded leftward. However, this is not required, and the end portions 178 may be expanded in various alternate directions. Each of the conductive islands 525 includes an expansion that is expanded in the end portions 178 of the corresponding data lines 171. One end of each of the conductive islands 525 functions as a first control electrode 527.

Each of the connection wires 176 is formed to be perpendicular to the dummy wires 621. The connection wires 176 are made of the same or similar materials as and are formed on the same layer as the data lines 171. Each of the connection wires 176 includes a first output electrode 176a, a second input electrode 176b, and an end portion 176c. The end portion of each of the connection wires 176 is connected to the dummy wire 621 through a contact hole 149 formed on a gate insulating layer 140.

The first even signal transmission lines 522 extend in a substantially horizontal direction, and then extend toward the second control electrodes 624 of the dummy wire 621. Each of the first even signal transmission lines 522 of the first data signal transmission lines 520 includes an expansion 526 to which the end portions 178 of the data lines 171 contact through the contact holes 144, 146 and 148 that have different exposed sizes S2, S4 and S6, respectively. As with the end portions 178 of the conductive islands 525, one end of each of the expansions 526 functions as the first control electrode 527. Meanwhile, the second even signal transmission lines 524 are directly connected to the end portions 178 of the corresponding data lines 171.

A plurality of semiconductor islands 156, made of a material such as hydrogenated a-Si, are formed on the gate insulating layer 140 as with the semiconductors 154, shown in FIG. 3. The semiconductor islands 156 and 158 overlap the corresponding first and second control electrodes 527 and 624. A plurality of ohmic contacts 166 and 167 are formed on the semiconductor islands 156 and 158 and are separated from one another. According to an embodiment of the invention, the ohmic contacts 166, 167, 168, and 169 comprise n+ hydrogenated a-Si heavily doped with an N-type impurity, silicide, or another similar material.

In this embodiment, each data line 171 further includes a first input electrode 174 projecting toward the first output electrode 176a of the connection wire 176 and a second output electrode 177 projecting toward the second input electrode 176b. The first output electrode 176a and the second input electrode 176b of each connecting wire 176 are also expanded toward the first input electrode 174 and the second output electrode 171, respectively.

One first electrode 527, one first input electrode 174, and one first output electrode 176a along with one first semiconductor island 156 form a TFT that functions as a first diode DO1, and one second control electrode 624, one second input electrode 176b, and one second output electrode 177 along with one second semiconductor island 158 form a TFT that functions as a second diode DO2. The TFTs include a channel formed in the first semiconductor island 156 disposed between the first input electrode 174 and the first output electrode 176a, and a channel formed in the second semiconductor island 158 disposed between the second input electrode 176b and the second output electrode 177.

In the TFTs, each of which has an input electrode (i.e., 174), an output electrode (i.e., 176a), and a control electrode 624, when the control electrode 624 is connected to an input electrode, the TFT functions as a diode.

The ohmic contacts 166, 167, 168, and 169 are interposed only between the underlying semiconductor islands 156 and 158 and the overlying first input electrodes 174 and the first output electrodes 176a, and the second input electrodes 176b and the second output electrodes 177 thereon to reduce contact resistance therebetween.

When manufacturing the TFT array panel or an LCD having the TFT array panel, static electricity, which flows along the data lines 171, is generated. When the amount of static electricity exceeds a specific amount, the data lines 171 or the TFTs connected to the data lines 171 may be damaged. Thus, the static electricity needs to be dispersed so as to avoid the damage to the data lines 171 or the TFT arrays.

When the static electricity is transmitted to the first data signal transmission lines 520 or the data lines 171, the static electricity is also transmitted to the first control electrodes 527 of the first diodes DO1 that are coupled to some of the first data signal transmission lines 520 or the data lines 171 through the contact holes 141 so as to open the channels of the first diodes DO1. When the channels of the first diodes DO1 are opened, the static electricity flows to the dummy wire 621 through the first input electrodes 174 to the first output electrode 176a to be dispersed and removed.

At this time, some of the static electricity dispersed through the dummy line 621 is applied to the second control electrodes 624 of the second diodes DO2 to also open the channels of the second diodes DO2. As a result, some of the static electricity is applied to the data lines 171 through the end portions 176c, the second input electrodes 176, and the second output electrodes 177 to be dispersed and removed.

As is described above, the exposed sizes S2, S4 and S6 of the contact holes 144, 146 and 148 differ while the exposed sizes of the contact holes 141 are substantially similar. However, in alternate embodiments, the exposed sizes of the contact holes 141 may be different based on a distance from the driver (not shown). For example, an exposed size of a contact hole 141 may increase as a distance from the driver increases.

Therefore, the static electricity is effectively dispersed, and resistance differences caused by length differences of the first and second data signal transmission lines 520 and 530 are also reduced.

The manufacturing method of the TFT array panel shown in FIG. 20 to FIG. 22 is substantially similar to that of the TFT array panel shown in FIGS. 3 and 4, except for the addition of the formation of the first and second diodes DO1 and SO2 when forming the TFTs. Therefore, a detailed description of the manufacturing method is omitted.

SIXTH EMBODIMENT

Figure 23:
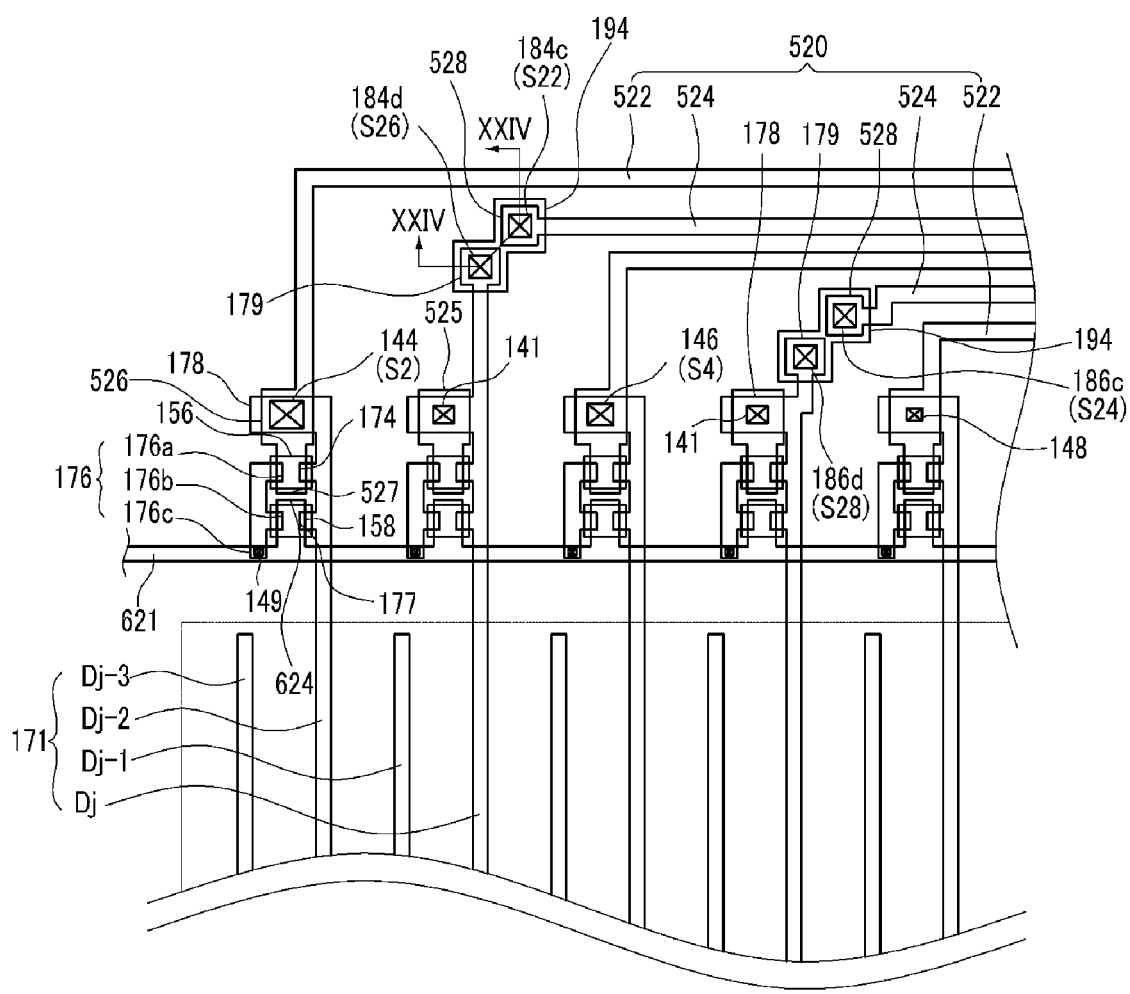
FIG. 23 is a layout view of data lines and signal transmission lines of an exemplary TFT array panel according to a sixth embodiment of the present invention.
Figure 24:
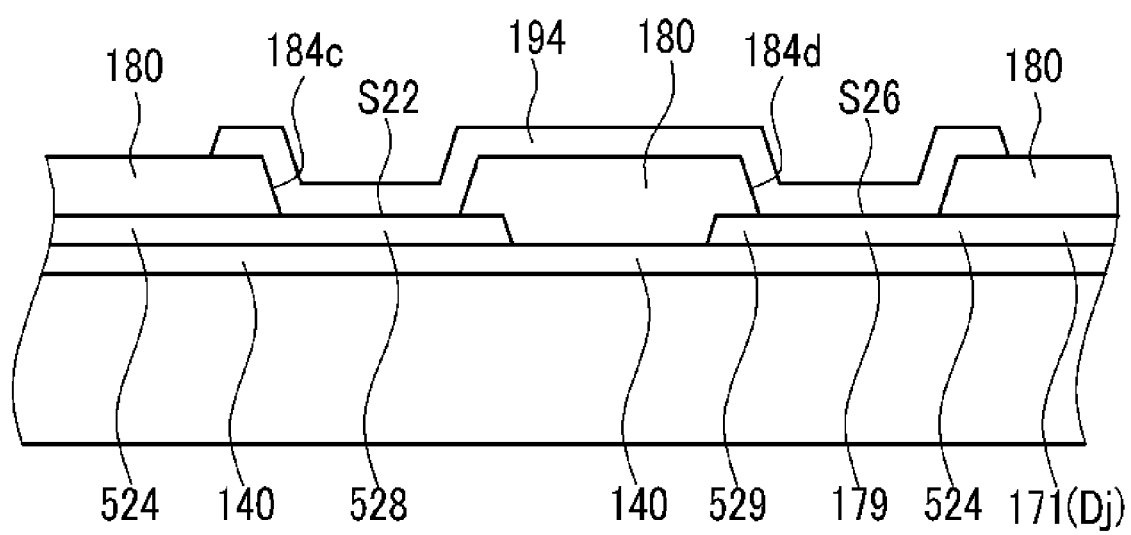
FIG. 24 is a sectional view of the TFT array panel shown in FIG. 23 taken along a line XXIV-XXIV.

Referring to FIGS. 23 and 24, a TFT array panel according to a sixth embodiment of the present invention will be described. A structure of the TFT array panel shown in FIGS. 23 and 24 is substantially similar to that of the TFT array panel shown in FIGS. 20 to 22. Therefore, as compared with FIGS. 20 to 22, elements performing the same operations are indicated by the same reference numerals and detailed descriptions thereof are omitted.

FIG. 23 is a layout view of data lines and signal transmission lines of an exemplary TFT array panel according to a sixth embodiment of the present invention, and FIG. 24 is a sectional view of the TFT array panel shown in FIG. 23 taken along a line XXIV-XXIV.

A schematic view of the TFT array panel, according to this embodiment, is similar to the schematic view of FIG. 19.

A connection relationship of the second even signal transmission lines 524 and the data lines 171 corresponding thereto shown in FIG. 23 is adapted to the second odd signal transmission lines 534 and the data lines 171 corresponding thereto that are formed on the fourth peripheral area PA4

Referring to FIGS. 23 and 24, only a detailed description of the second even signal transmission lines 524 and the corresponding data lines 171 formed on the third peripheral area PA3 will be given.

As compared with the fifth embodiments, elements performing the same operations are indicated by the same reference numerals and detailed descriptions thereof are omitted.

Referring to FIGS. 23 and 24, in the TFT array panel, the second even signal transmission lines 524 and the corresponding data lines 171 are connected through contact holes 184c, 186c, 184d and 186d, as compared with FIGS. 20 to 21.

The second even signal transmission lines 524 extend in a substantially horizontal direction, and each of the second even signal transmission lines 524 includes a wide end portion 528 having a large area. In addition, the data lines 171 corresponding to the second even signal transmission lines extend proximate to the second even signal transmission lines 524 in a substantially vertical direction, and each of the data lines 171 includes a wide end portion 179 having a large area, which is formed adjacent to the end portions 528.

A passivation layer 180 includes the contact holes 184c and 186c exposing the wide end portions 528 of the second even signal transmission lines 524, respectively. The passivation layer 180 further includes the contact holes 184d and 186d exposing the wide end portions 179 of the data lines 171 corresponding to the wide end portions 528 of the second even signal transmission lines 524, respectively.

The exposed sizes S22 and S24 of the wide end portions 528 of the second even signal transmission lines 524 increase as a distance from the driver 400 increases. The exposed sizes S26 and S28 of the wide end portions 179 of the data lines 171 also increase as a distance from the driver 400 increases.

A plurality of connecting members 194 are further formed on the passivation layer 180 and the exposed sizes S22, S24, S26 and S28. The connecting members 194 are made of the same or a similar material and are formed on the same layer as the pixel electrodes 190. As such, the wide end portions 528 of the second even signal transmission lines 524 contact the wide end portions 179 of the data lines 171 through the connecting members 184.

Therefore, the contact sizes of the wide end portions 528 of the second even signal transmission lines 524 and the wide end portions 179 of the data lines 171 also increase as a distance from the driver 400 increases.

According to the TFT array panel shown in FIGS. 23 and 24, when forming the diodes DO1 and DO2, resistance differences caused by length differences of the second even and odd signal transmission lines 524 and 534 as well as the first even and odd signal transmission lines 522 and 532 are reduced to decrease resistance differences of the data signal transmission lines 520 and 530.

SEVENTH EMBODIMENT

A TFT array panel according to a seventh embodiment of the present invention will be described with reference to FIGS. 25 and 26. The description of the TFT array panel of this embodiment will be given in comparison with FIGS. 5 to 7.

A schematic view of the TFT array panel, according to this embodiment, is similar to the schematic view of FIG. 2.

As compared with FIGS. 5 to 7 and 25, elements performing the same operations are indicated by the same reference numerals, and the detailed description thereof is omitted.

Figure 25:
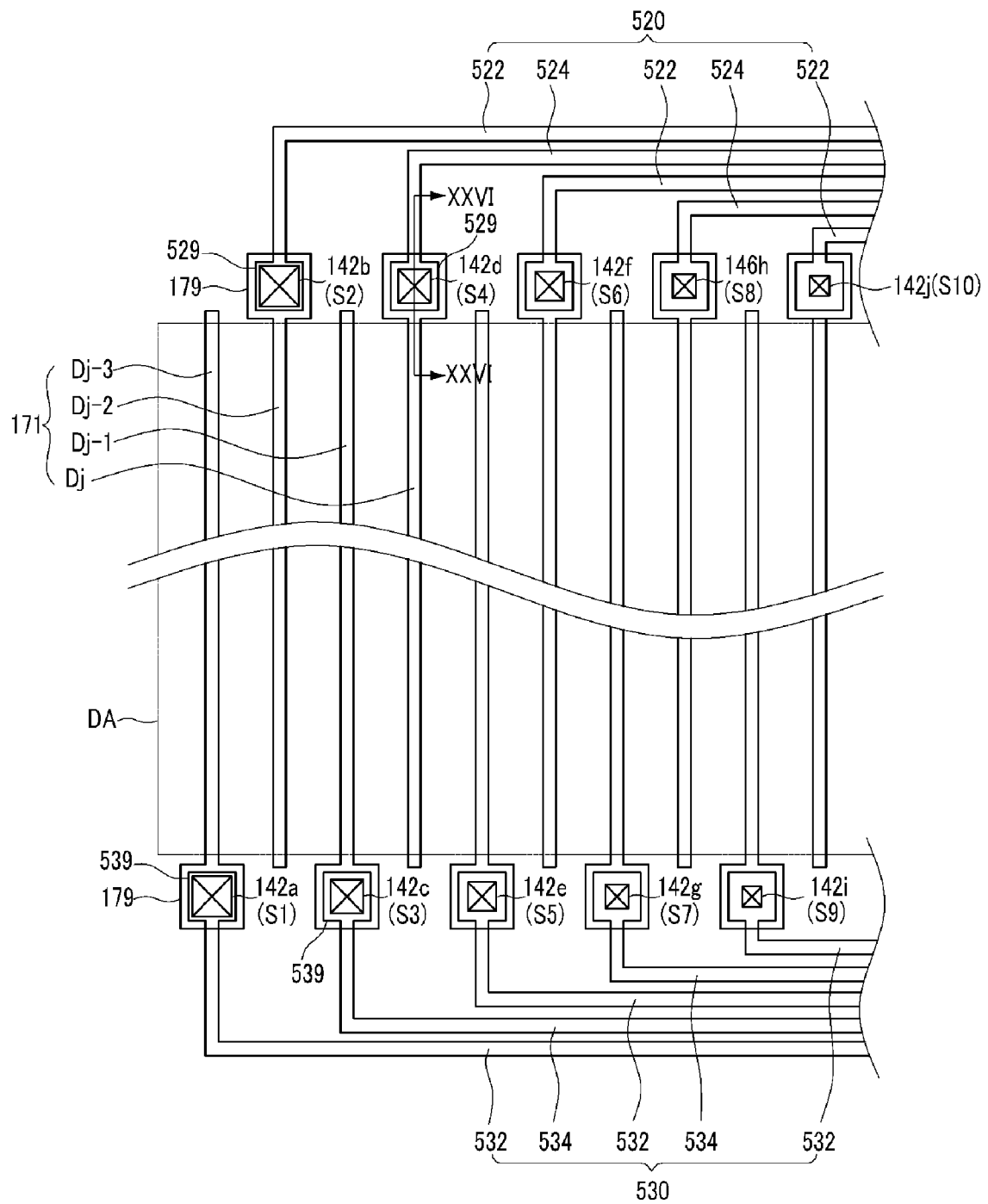
FIG. 25 is a layout view of data lines and signal transmission lines of a TFT array panel according to a seventh embodiment of the present invention.
Figure 26:
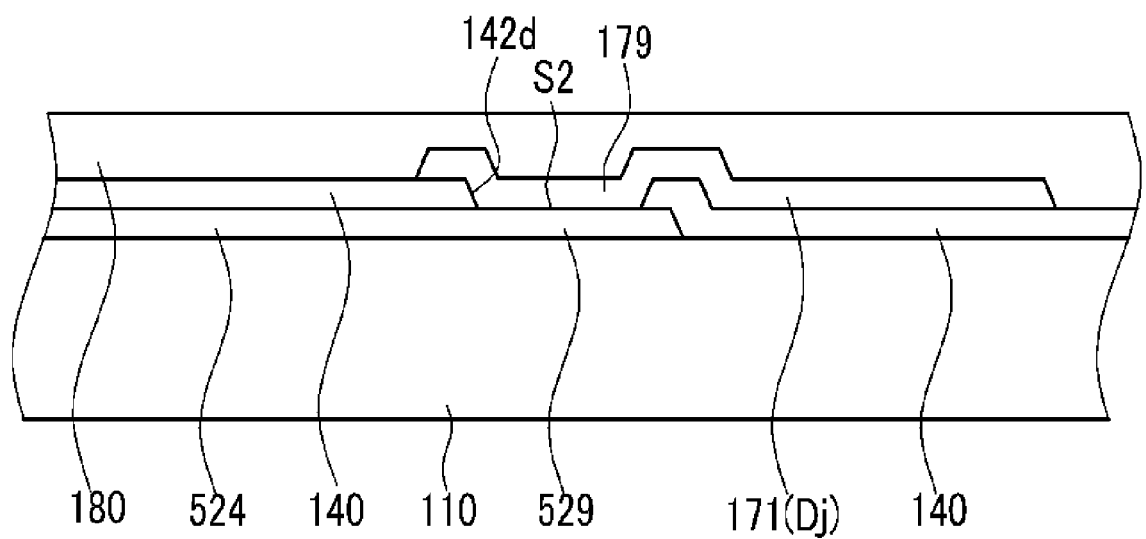
FIG. 26 is a sectional view of the TFT array panel shown in FIG. 25 taken along a line XXVI-XXVI.

FIG. 25 is a layout view of data lines and signal transmission lines of a TFT array panel according to a seventh embodiment of the present invention, and FIG. 26 is a sectional view of the TFT array panel shown in FIG. 25 taken along a line XXVI-XXVI.

Referring to FIGS. 25 and 26, a connection manner of second even and odd signal transmission lines 524 and 534 and corresponding data lines 171 is substantially similar to that of first even and odd signal transmission lines 522 and 532 and corresponding data lines 171. Therefore, the second even and odd signal transmission lines 524 and 534 are made of the first metal that is the same or a similar material as that of the gate lines 121 and formed on the same layer as the gate lines 121.

A gate insulating layer 140 includes a plurality of contact holes 142a to 142j exposing the wide end portions 529 and 539 of the first and second even signal transmission lines 522 and 524 and the first and second odd signal transmission lines 532 and 534, respectively. Exposed sizes S1 to S10 through the contact holes 142a to 142j increase as the distance from the driver 400 increases. Therefore, the contact sizes of the end portions 529 and 539 of the even and odd signal transmission lines 522, 524, 532 and 534 and the data lines 171 also increase as a distance from the driver 400 increases. As a result, resistance differences of the data signal transmission lines 520 and 530 due to length differences of the data signal transmission lines 520 and 530 are reduced.

EIGHTH EMBODIMENT

A TFT array panel according to an eighth embodiment of the present invention will be described with reference to FIGS. 27 and 28. The description of the TFT array panel of this embodiment will be given in comparison with FIGS. 5 to 7.

A schematic view of the TFT array panel, according to this embodiment, is similar to the schematic view of FIG. 2.

As compared with FIGS. 16 to 17 and 27 to 28, elements performing the same operations are indicated by the same reference numerals, and detailed descriptions thereof are omitted.

Figure 27:
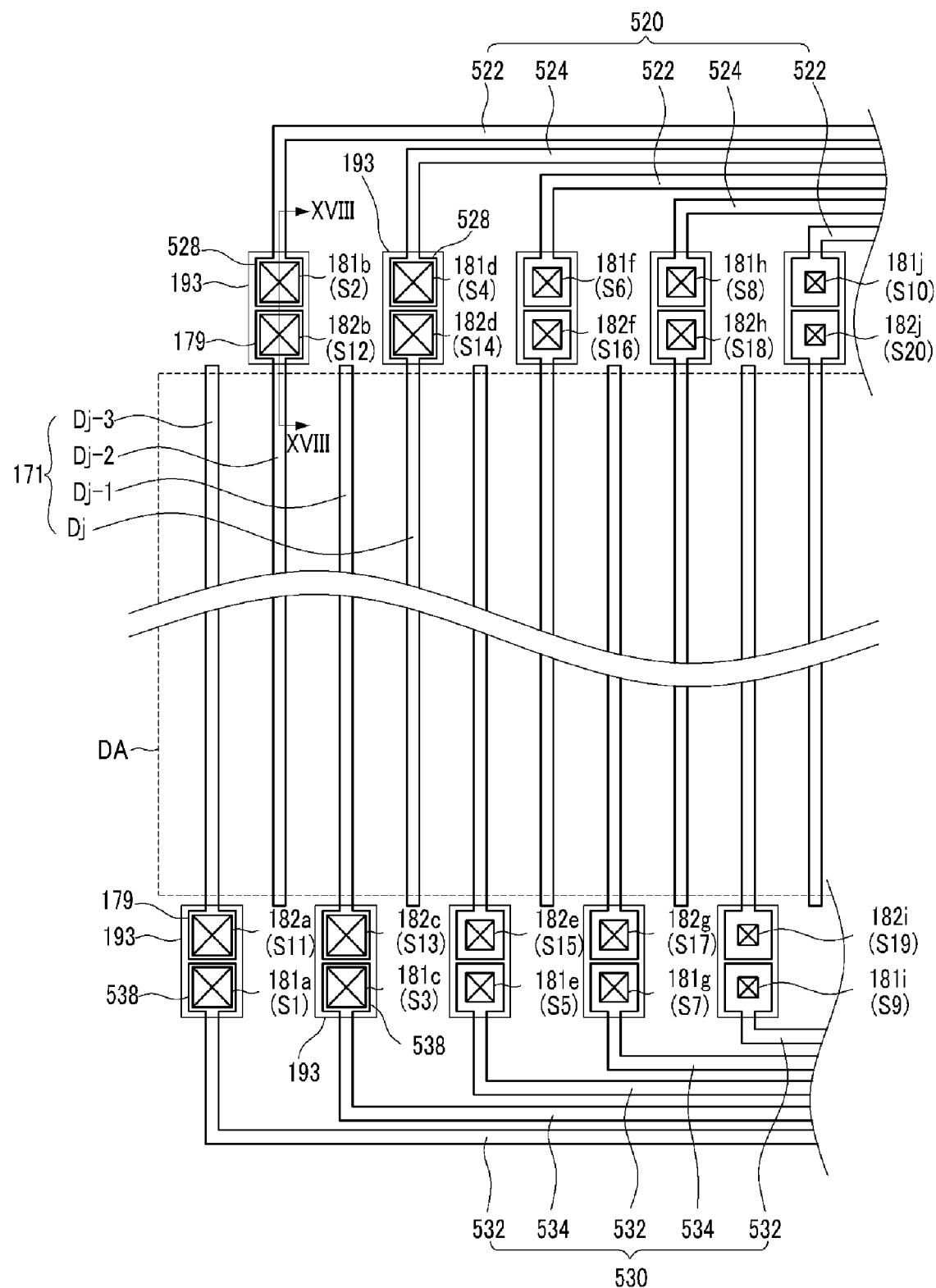
FIG. 27 is a layout view of data lines and signal transmission lines of a TFT array panel according to an eighth embodiment of the present invention.
Figure 28:
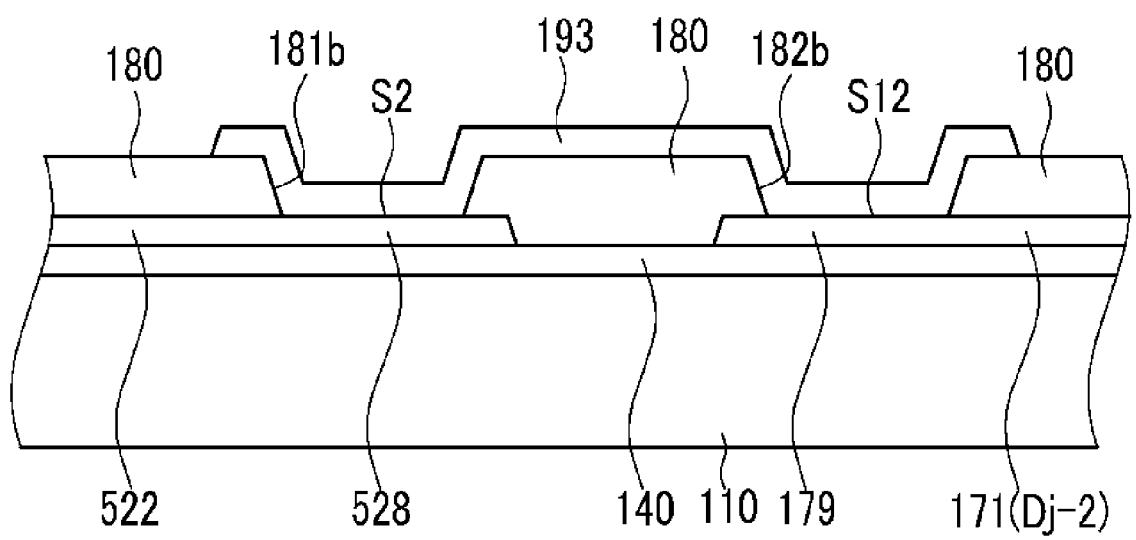
FIG. 28 is a sectional view of the TFT array panel shown in FIG. 27 taken along a line XXVIII-XXVII.

FIG. 27 is a layout view of data lines and signal transmission lines of a TFT array panel according to an eighth embodiment of the present invention, and FIG. 28 is a sectional view of the TFT array panel shown in FIG. 27 taken along a line XXVIII-XXVIII.

Referring to FIGS. 27 and 28, a connection manner of second even and odd signal transmission lines 524 and 534 and the data lines 171 corresponding thereto is substantially similar to that of the first even and odd signal transmission lines 522 and 532 and the data lines 171 corresponding thereto. Therefore, the first even and odd signal transmission lines 522 and 532 are made of the second metal that is the same or a similar material as the data lines 171 and formed on the same layer as the data lines 171.

As shown in FIG. 28, a plurality of contact holes 181a, 181b, 181e, 181f, 181i and 181j exposing the wide end portions 528 and 538 of the first even and odd signal transmission lines 522 and 532, respectively, are formed in the same manner as the contact holes 181c, 181d, 181g, and 181h of the wide end portions 528 and 538 of the second even and odd signal transmission lines 524 and 534, and have the same or a similar shape as those of the contact holes 181c, 181d, 181g and 181h.

Exposed sizes S1 to S10 through the contact holes 181a to 181j and exposed sizes S11 to S20 through the contact holes 182a to 182j increase as the distance from the driver 400 increases. Therefore, the contact sizes of the wide end portions 529 and 539 of the even and odd signal transmission lines 522, 524, 532 and 534 and the data lines 171 also increase as a distance from the driver 400 increases. As a result, resistance differences of the data signal transmission lines 520 and 530 due to length differences of the data signal transmission lines 520 and 530 are reduced.

According to the embodiments of the invention discusses above and/or other embodiments, since the driver is disposed on the left or right side of the display area, the size of the upper or lower peripheral area decreases. In addition, signal delay differences due to length differences of the signal transmission lines are reduced or effected prevented by the difference in contact sizes of the contact holes.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A thin film transistor array panel including a display area and a peripheral area having first, second, third, and fourth peripheral areas, the thin film transistor comprising:
    a plurality of gate lines formed on an insulation substrate and extended in a first direction;
    a gate insulating layer formed on the gate lines;
    a plurality of data lines formed on the gate insulating layer and extended in a second direction, the second direction being perpendicular to the first direction;
    a driver disposed on the first or second peripheral area; and
    a plurality of data signal transmission lines formed on at least one of the third and fourth peripheral areas, wherein:
    portions of the data signal transmission lines include end portions connected to end portions of the data lines and having different contact sizes in accordance with respective distances from the driver, and
    the first peripheral area faces the second peripheral area in the first direction, and the third peripheral area faces the fourth peripheral area in the second direction,
    wherein the plurality of data signal transmission lines comprise a plurality of first data signal transmission lines formed on the third peripheral area and a plurality of second data signal transmission lines formed on the fourth peripheral area,
    wherein the plurality of the first data signal transmission lines comprise a plurality of first even signal transmission lines formed on the same layer as the gate lines and a plurality of second even signal transmission lines formed on the same layer as the data lines and on a different layer from that of the first even signal transmission lines,
    wherein the plurality of the second data signal transmission lines comprise a plurality of first odd signal transmission lines formed on the same layer as the gate lines and a plurality of second odd signal transmission lines formed on the same layer as the data lines and on a different layer from that of the first odd signal transmission lines, and
    wherein the first even signal transmission lines and the first odd signal transmission lines comprise a first metal, wherein the first metal is the same metal as that of the gate lines and the second even signal transmission lines and the second odd signal transmission lines comprise a second metal, wherein the second metal is the same metal as that of the data lines and has a lower characteristic resistivity than the first metal.

2. The thin film transistor array panel of claim 1, wherein each first data signal transmission lines is connected to even-numbered data lines of the data lines and the driver; and
    each second data signal transmission lines is connected to odd-numbered data lines of the data lines and the driver.

3. The thin film transistor array panel of claim 2, wherein the first even signal transmission lines are connected to (j−2)-th data lines; and
    the second even signal transmission lines are connected to j-th data lines, wherein j is a multiple of four,
    the first odd signal transmission lines are connected to (j−3)-th data lines; and
    the second odd signal transmission lines are connected to (j−1)-th data lines.

4. The thin film transistor array panel of claim 1, wherein:
    the gate insulating layer comprises a plurality of first contact holes exposing the end portions of the first even signal transmission lines with different exposed sizes and a plurality of second contact holes exposing the end portions of the first odd signal transmission lines with different exposed sizes; and
    the end portions of the first even signal transmission lines contact the end portions of the data lines through the first contact holes with different contact sizes, and the end portions of the first odd signal transmission lines contact the end portions of the data lines through the second contact holes with different contact sizes.

5. The thin film transistor array panel of claim 4, further comprising a passivation layer formed on the data lines and the data signal transmission lines, wherein the passivation layer comprises:
    a plurality of third contact holes which expose the end portions of the second even signal transmission lines with different exposed sizes;
    a plurality of fourth contact holes which expose the end portions of the second odd signal transmission lines with different exposed sizes;
    a plurality of fifth contact holes which expose the end portions of the data lines corresponding to the second even signal transmission lines with different exposed sizes; and
    a plurality of sixth contact holes which expose the end portions of the data lines corresponding to the second odd signal transmission lines with different exposed sizes.

6. The thin film transistor array panel of claim 5, further comprising:
    a plurality of first connecting members formed on the passivation layer and contacting the end portions of the second even signal transmission lines exposed through the third contact holes and the end portions of the corresponding data lines exposed through the fifth contact holes with different contact sizes; and
    a plurality of second connecting members formed on the passivation layer and contacting the end portions of the second odd signal transmission lines exposed through the fourth contact holes and the end portions of the corresponding data lines exposed through the sixth contact holes with different contact sizes.

7. The thin film transistor array panel of claim 4, further comprising:
    at least one dummy wire, comprising a same material as that a of each of the gate lines, formed on one of the third and fourth peripheral areas and insulated from the gate lines and the data signal transmission lines;
    a plurality of connection wires, each comprising a same material as that of each of the data lines, spaced apart from the data lines and connected to the dummy wire; and a plurality of first diodes connected to the connection wires and the data lines, wherein each of the first diodes includes a first control electrode extended from the end portions of each corresponding first even signal transmission lines, a first input electrode, a first output electrode and a first semiconductor formed on the gate insulating layer and between the first input electrode and the first output electrode.

8. The thin film transistor array panel of claim 7, wherein:
the gate insulating layer further comprises a plurality of third contact holes, and
the end portions of the data lines directly connected to the second even signal transmission contact the first control electrodes through the third contact holes, respectively.

9. The thin film transistor array panel of claim 8, wherein:
the dummy wire further comprises a plurality of second control electrodes,
each of the connection wires further comprises a second input electrode,
each of the data lines further comprises a second output electrode facing the second input electrode, and
the thin film transistor array panel further comprises a plurality of second semiconductors, wherein:
each of the second semiconductors being formed on the gate insulating layer and between the second input electrode and the second output electrode, and
the second control electrode, the second semiconductor, the second input electrode, and the second output electrode form a second diode.

10. The thin film transistor array panel of claim 9, further comprising a passivation layer formed on the data lines and the data signal transmission lines, wherein the passivation layer comprises:
a plurality of fourth contact holes which expose the end portions of the second even signal transmission lines with different exposed sizes; and
a plurality of fifth contact holes which expose the end portions of the data lines corresponding to the second even signal transmission lines with different exposed sizes.

11. The thin film transistor array panel of claim 10, further comprising a plurality of first connecting members, formed on the passivation layer, which contact the end portions of the second even signal transmission lines exposed through the fourth contact holes and the end portions of the corresponding data lines exposed through the fifth contact holes with different contact sizes.

12. The thin film transistor array panel of claim 7, further comprising a passivation layer formed on the data lines and the data signal transmission lines, the passivation layer comprising:
a plurality of first contact holes which the end portions of the first even signal transmission lines with different exposed sizes along with the gate insulating layer;
a plurality of second contact holes which the end portions of the first odd signal transmission lines with different exposed sizes along with the gate insulating layer;
a plurality of third contact holes which expose the end portions of the data lines corresponding to the first even signal transmission lines with different exposed sizes along with the gate insulating layer; and
a plurality of fourth contact holes which expose the end portions of the data lines corresponding to the first odd signal transmission lines with different exposed sizes along with the gate insulating layer.

13. The thin film transistor array panel of claim 12, further comprising:

a plurality of first connecting members, formed on the passivation layer, which contact the end portions of the first even signal transmission lines exposed through the first contact holes and the end portions of the corresponding data lines exposed through the third contact holes with different contact sizes; and
a plurality of second connecting members, formed on the passivation layer, which contact the end portions of the first odd signal transmission lines exposed through the second contact holes and the end portions of the corresponding data lines exposed through the fourth contact holes with different contact sizes.

14. The thin film transistor array panel of claim 13, wherein the passivation layer further comprises:
a plurality of fifth contact holes which expose the end portions of the second even signal transmission lines with different exposed sizes;
a plurality of sixth contact holes which expose the end portions of the second odd signal transmission lines with different exposed sizes;
a plurality of seventh contact holes which expose the end portions of the data lines corresponding to the end portions of the second even signal transmission lines with different exposed sizes; and
a plurality of eighth contact holes which expose the end portions of the data lines corresponding to the end portions of the second odd signal transmission lines with different exposed sizes.

15. The thin film transistor array panel of claim 14, further comprising:
a plurality of third connecting members, formed on the passivation layer, which contact the end portions of the second even signal transmission lines exposed through the fifth contact holes and the end portions of the corresponding data lines exposed through the seventh contact holes with different contact sizes; and
a plurality of fourth connecting members, formed on the passivation layer, which contact the end portions of the second odd signal transmission lines exposed through the sixth contact holes and the end portions of the corresponding data lines exposed through the eighth contact holes with different contact sizes.

16. The thin film transistor array panel of claim 15, further comprising pixel electrodes formed on the passivation layer, wherein the first to fourth connecting members comprise the same material as that of the pixel electrodes.

17. The thin film transistor array panel of claim 1, wherein the contact sizes of the connection lines increase as respective distances of the connection lines from the driver increases.

18. A manufacturing method of a thin film transistor array panel including a display area, a peripheral area having first, second, third, and fourth peripheral areas, and a driver disposed on the first or second peripheral area, the manufacturing method comprising:
forming a plurality of gate lines extended in a first direction on an insulation substrate;
forming a gate insulating layer on the gate lines;
forming a plurality of data lines extended in a second direction on the gate insulating layer, the second direction being perpendicular to the first direction; and
forming a plurality of data signal transmission lines on at least one of the third and fourth peripheral areas, portions of the data signal transmission lines comprising:
end portions connected to end portions of corresponding data lines with different contact sizes in accordance with respective distances from the driver, and
other end portions connected to the driver, wherein the plurality of data signal transmission lines comprise a plurality of first data signal transmission lines formed on the third peripheral area and a plurality of second data signal transmission lines formed on the fourth peripheral area, wherein the plurality of the first data signal transmission lines comprise a plurality of first even signal transmission lines formed on the same layer as the gate lines and a plurality of second even signal transmission lines formed on the same layer as the data lines and on a different layer from that of the first even signal transmission lines, wherein the plurality of the second data signal transmission lines comprise a plurality of first odd signal transmission lines formed on the same layer as the gate lines and a plurality of second odd signal transmission lines formed on the same layer as the data lines and on a different layer from that of the first odd signal transmission lines, and wherein the first even signal transmission lines and the first odd signal transmission lines comprise a first metal, wherein the first metal is the same metal as that of the gate lines and the second even signal transmission lines and the second odd signal transmission lines comprise a second metal, wherein the second metal is the same metal as that of the data lines and has a lower characteristic resistivity than the first metal.

19. The manufacturing method of claim 18, further comprising:

forming a plurality of contact holes on the gate insulating layer which expose the portions of the data signal transmission lines with different exposed sizes, wherein the end portions of the data lines contact the end portions of the data signal transmission lines exposed through the contact holes with different contact sizes, respectively.

20. The manufacturing method of claim 18, further comprising:

forming a passivation layer on the data lines; and forming a plurality of connecting members on the passivation layer, wherein:

the passivation layer comprises a plurality of first contact holes which expose the end portions of portions of the data signal transmission lines with different exposed sizes and a plurality of second contact holes which expose the end portions of portions of the data lines with different exposed sizes, and the connecting members contact the end portions of the portions of the data signal transmission lines and the end portions of the portions of the data lines through the first and second contact holes with different contact sizes, respectively.

* * * * *